(12) United States Patent
Vaillancourt et al.

(10) Patent No.: US 7,340,410 B1
(45) Date of Patent: Mar. 4, 2008

(54) SALES FORCE AUTOMATION

(75) Inventors: Jane Ellen Vaillancourt, San Jose, CA (US); Katherine Schwertley, Saratoga, CA (US); Rita Jean Welshons, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 1153 days.

(21) Appl. No.: 10/172,833

(22) Filed: Jun. 13, 2002

(51) Int. Cl.
G06F 17/30 (2006.01)

(52) U.S. Cl. .................. 705/10; 705/1; 705/8; 705/9

(58) Field of Classification Search .............. 705/1, 705/8, 9, 10
See application file for complete search history.

(56) References Cited

U.S. PATENT DOCUMENTS

| 5,765,143 | A | 6/1998 | Sheldon et al. |
| 5,930,764 | A | 7/1999 | Melchione et al. |
| 5,978,836 | A | 11/1999 | Ouchi |
| 6,067,525 | A * | 5/2000 | Johnson et al. ............. 705/10 |
| 6,078,892 | A | 6/2000 | Anderson et al. |
| 6,327,611 | B1 | 12/2001 | Everingham |
| 6,662,164 | B1 | 12/2003 | Koppelman et al. |
| 6,678,714 | B1 * | 1/2004 | Olapurath et al. .......... 718/104 |
| 6,721,611 | B2 | 4/2004 | Schneider et al. |
| 6,760,727 | B1 | 7/2004 | Schroeder et al. |
| 6,850,895 | B2 | 2/2005 | Brodersen et al. |
| 6,868,389 | B1 | 3/2005 | Wilkins et al. |
| 7,035,699 | B1 | 4/2006 | Anderson et al. |
| 7,047,206 | B1 * | 5/2006 | Schultze ..................... 705/10 |
| 7,228,284 | B1 | 6/2007 | Vaillancourt et al. |
| 2001/0047289 | A1 | 11/2001 | McKee et al. |
| 2002/0026356 | A1 | 2/2002 | Bergh et al. |
| 2002/0035504 | A1 | 3/2002 | Dver et al. |
| 2002/0059095 | A1 | 5/2002 | Cook |
| 2002/0077998 | A1 | 6/2002 | Andrews et al. |
| 2002/0082892 | A1 | 6/2002 | Raffel et al. |
| 2003/0023519 | A1 | 1/2003 | Zulpa et al. |
| 2006/0064340 | A1 | 3/2006 | Cook |

FOREIGN PATENT DOCUMENTS

| JP | 02001167081 A | 6/2001 |
| WO | WO98/49641 | 11/1998 |

OTHER PUBLICATIONS

Clarify Unveils Next Generation eFront Office Application for Sales. PR Newswire, Sep. 1, 1999. from dialog file 16: 06603769.*

(Continued)

Primary Examiner—Beth Van Doren
Assistant Examiner—Johnna Loftis
(74) Attorney, Agent, or Firm—W. Eric Webostad

(57) ABSTRACT

Method and apparatus for automating a sales force is described. More particularly, a sales force automation program is provided having a leads module, a commissions module and a forecasting module. Record objects, generated within a module, are automatically routed for processing. Such record objects are routed from one computer to another via the Internet. A server with the sales force automation program is coupled to a sales database for providing information from and to client computers accessing the sales force automation program.

9 Claims, 19 Drawing Sheets

OTHER PUBLICATIONS

Dance, Richard D. "Managing Sales and Customers". Managment Accounting; May 1998. ABI/Inform Global.*

U.S. Appl. No. 09/969,069, Vaillancourt, Jane et al.; "Split Commissions", filed Oct. 2, 2001, 26 pages, available from Xilinx Inc., 2100 Logic Drive, San Jose, CA 95124.

U.S. Appl. No. 09/993,257, Vaillancourt, Jane et al.; "Forecasting", filed Nov. 13, 2001, 27 pages, available from Xilinx Inc., 2100 Logic Drive, San Jose, CA 95124.

Hennessey, Hubert, "Software Propels the Selling Cycle", Software Magazine, Jun. 1988; vol. 8, No. 9, pp. 57-64.

Collins, Robert, "Mastering Inquiries and Sales Leads", The Journal of Personal Selling & Sales Management, Summer 1989, vol. 9, No. 2, pp. 73-75.

Griggs, Robyn, "Taking the Leads", Sales and Marketing Management, Sep. 1995, vol. 147, Issue. 9, 3 pages.

Lamons, Bob, "Be Smart: Offer Inquiry Qualification Services", Marketing News, Nov. 6, 1995, vol. 29, No. 23, p. 13 (1 of 1).

Siebel, Thomas et al., "Virtual Selling: An Introduction", Going Beyond the Automated Sales Force to Achieve Total Sales Quality, Siebel Magazine, vol. 1, No. 1, pp. 20-23.

Freidmand, Lawrence G. et al., "The Channel Advantage", Butterworth Heinemann, 1999, ISBN: 0-7506-4098-7, 57 pages.

Rolnicki, Kenneth, "Managing Channels of Distribution: The Marketing Executive's Complete Guide", American Management Association, 1998, ISB: 0-8144-0335-2.

Novick, Harold, "Selling Through Independent Reps", Third Edition, American Mangement Association, 2000, ISBN: 0-8144-0522-3.

U.S. Appl. No. 09/575,283, filed May 22, 2000, Bergh et al., "Customer Lead Management System", Marketsoft Inc., based on U.S. Appl. No. 60/135,521, filed May 21, 1999, pp. 1-41.

Taylor, Thayer C., "Giving Sales Leads A Leading Edge", S & MM Sales & Marketing Mangement, vol. 127, No. 4, Sep. 1981, Abstract, 1 page.

Blue, Karen, "Closing the Loop: Hewlett-Packard's nNw Lead Managment System", Business marketing, vol. 72, No. 10, Oct. 1987, Abstract, 1 page.

Erschik, Richard W., "Sales Leads Can Truly Be Seeds of Sales", The Journal of Business & Industrial Marketing, vol. 4, No. 2, Summer/Fall 1989, pp. 27-31.

Stein, Tom, "Closer to Customers"—Suites Integrate help desk, sales and support apps in a single package; Information Week, May 12, 1997, 3 pages.

Griggs, Robyn, "Give Us Leads! Give Us Leads!", Sales and marketing mangement, vol. 149, No. 7, Jul. 1997, pp. 66-72.

Business Wire, ChannelWave Introduces Release 2.0 of Partner Relationship Managment Software, Business Wire, Jan. 25, 1999, 3 pages.

MARKETSOFT, MarketSoft Launches First Web-Based Lead Management Solution; Fixing a Fundamentally Broken Process, PR Newswire, May 24, 1999, 18 pages.

Kay, Alan S., "Smooth Sailing In The Channel", CIO, Jun. 15, 1999, 7 pages.

Goldenberg, Barton, "The Marketing Automation Explosion", Destination CRM, destinationCRM.com, Jan. 1, 2000, 4 pages.

Hakala, David, "Answering The Sales Call", Sm@rt Reseller, vol. 3, No. 3, Jan. 24, 2000, 3 pages.

PR Newswire, "Pivotal Selects MarketSoft's Lead Mangement Solution", PR Newswire, May 1, 2000, 3 pages.

Business Editors, "Front Line Solutions Releases ePartner2000 Best Practices Report", Business Wire, May 9, 2000, 2 pages.

Raone, Gina, "Keeping Partners Together—Suppliers Tap RPM to Boost Channels", eWeek, Apr. 9, 2001, 5 pages.

PR Newswire, "MarketSoft Launches First Web-Based Lead managment Solution, Fixing A Fundamentally Broken Process", May 14, 1999, 3 pages, MarketSoft.com web pages.

Channelwave, "PRM—Partner Relationship Management" May 2000, Retrieved from Archive.org Jun. 21, 2006, 20 pages, ChannelWave.com web pages.

Alwang, Greg, "Sell Smarter", PC Magazine Review—UpShot.com, PC Magazine, Sep. 19, 2000, 15 pages.

"Clarify Redefines Customer Relations Mangement with Introduction of eFrontOffice", Mar. 18, 1999, PR News Wire, 6 pages, findwealth.com web pages.

"Clarify Does e-Commerce FrontOffice", Unix & NT News, Apr. 1999, p. 1 of 1.

Sarkar, Christian, "Building Profitable Relationships: CRM Tools", Sep. 1999, 4 pages, One World, onewwworld.com/crmtools.html.

Alwang, Greg, "Sell Smarter", PC Magazine Austrailia, Nov. 2000, www.adnet.com.au, 11 pages.

Goldenberg, Barton, "Telesales/Telemarketing Gets A Face-Lift", destination CRM, Jan. 1, 2000, 4 pages.

"Record-Breaking Enterprise Scalability with Clarify FrontOffice", 1999, 19 pages.

Clarify, Inc., "Clarify Architecture— A Technology Overview", White Paper, 2000, pp. 1-46.

Siebel Systems, Inc., "Siebel Systems, Inc. Field Sales Applications", 2001, TechRepublic.com, 14 pages.

"Sales Force Automation Component Overview", 2001, salesforce.com, pages.

Friedman, Lawrence G., et al., "The Channel Advantage" Butterworth-Heinemann, 1999, 23 pages.

LeadMaster.com Web Pages, Jul. 2000-Apr. 2001, Retrieved from Archive.org Jan. 19, 2006, 32 pages.

Pivotal.com Web Pages, Mar.-Aug. 2000, Retrieved from Archive.org, Jan. 19, 2006, 14 pages.

Sales Logix, SalesLogix.com Web Pages, Apr. 2001, Retrieved from Archive.org, Aug. 30, 2005, 19 pages.

Onyx Software, Onyx.com Web Pages, 1999-2000, Retrieved from Archive.org, Jan. 18, 2006, 12 pages.

Salesforce.com Web Pages, Feb. 2001, Retrieved from Archive.org, Jan. 18, 2006, 4 pages.

UpShot.com—Help Manual/Files, Jul. 21, 1998, 81 pages.

UpShot.com—Quick Reference Guide, Feb. 2001, Retrieved from Archive.org, Aug. 29, 2005, 5 pages.

UpShot.com—Data Sheet—Upshot Online Service, Feb. 2001, Retrieved from Archive.org, Aug. 29, 2005, 4 pages.

Rupley, Sebastian, "Customer Care on Wall Street", Jun. 27, 2000, PC Magazine, 3 pages.

Goldberg, Barton, "The Marketing Automation Explosion", DestinationCRM.com, Jan. 1, 2000, 4 pages.

Goldberg, Barton, "Taking Account", DestinationCRM.com, Jan. 1, 2000, 4 pages.

Goldberg, Barton, "Managing The Sales Force", DestinationCRM.com, Jan. 1, 2000, 3 pages.

Dickie, Jim, "CRM for the Little Guy" What's In It for Me?, DestinationCRM.com, Jul. 19, 2000, 2 pages.

Captured Images from incentivsystems.com from the "wayback machine", 2000, pp. 1-9.

* cited by examiner

Design Registration DR36510-071800

Project/ID: test / DR36510-071800
Disti Branch: HAMILTON AVNET / 120975 / H018
Type: Design DR Expires: 10/16/00 Status: Requested Detail | Line Items | Notes

Registration Type: Demand Fulfillment
Margin: 12
Est. Production Date: 07/18/00
Board:
End Customer Id/Name: 142790 ANALOGIC
City/St./Pr.: PEABODY MA
Country/Postal Code: USA 01961
Project Engineer: test test
Phone: 978-532-9826
Purchasing Contact:
Phone:

Disti Sales Person: john ferraro
Disti FAE:
Disti Tracking No:
Xilinx FAE:
Rep Company: Genesis - MA
Rep Salesperson(OSR): Gerry LaCombe
Dev. System: DS-FND-DAS
Core: Please Speci

Opportunity:
Approve | Deny | Create Draft Quote | Revise
Submit | Cancel DR | | New
Wip Bin: TRASH Copy DR
Queue:
Show Lead | View Activity Log | Owner: jnelson | Save | Done
Ready | | | | 10:27 AM

FIG. 8

SALES FORCE AUTOMATION

FIELD OF THE INVENTION

The present invention generally relates to sales force automation, and more particularly to an object-oriented computer system for sales force automation.

BACKGROUND OF THE INVENTION

Sales activity is an import component to any organization attempting to generate revenue from sales of goods or services. However, mitigating against sales efforts is the complex and diversified nature of sales cycles. For example, sales activity may be done apart from headquarters, such as at distributors, independent sales organizations (ISOs), regional offices, field sales organizations (FSOs) and the like. These offices may be located in multiple countries.

Accordingly, significant quantities of time, effort and paper may be needed to capture and track sales related transactions. A portion of sales activity is in leads, quotes, forecasting and other activity. Though such activity is documentable, it may go undocumented owing to time constraints and lack of a structured reporting mechanism. Moreover, sales may involve obtaining information from organization outside of a sales organization, such as from marketing, corporate management, engineering and the like.

Therefore, it would be desirable to provide a solution that automates and streamlines a sales cycle process through increased workflow efficiency, improved communications, integration of business systems, and automation of document management and routing. Moreover, such a solution should integrate with other business systems to create seamless paths for data transmission and distribution.

SUMMARY OF THE INVENTION

A decision to automate sales processes led to a goal of implementing a comprehensive sales force automation (SFA) system or package that would automate interactions of sales management, marketing, ISOs, FSOs, distributors and other organizations. Automation would include business process areas of commission management, forecasting and lead management. Such an SFA system would facilitate global adoption, an enter once concept, a one deal concept, system integration, alignment of sale objectives and system flexibility.

An aspect of the present invention is a sales force automation system. More particularly, a first computer is provided. The first computer is programmed with a web-enabled client. A second computer in communication with the first computer is provided. The second computer is programmed with a sales force automation program and a web-enabled server. A sales information database is accessible by the second computer. The sales force automation program has a plurality of modules. The plurality of modules comprises at least one of a leads module, a commissions module and a forecasting module.

Another aspect of the present invention is a method for automating a sales force. More particularly, a first computer programmed with a first web-enabled client is provided. A second computer in communication with the first computer is provided. The second computer is programmed with a sales force automation program and a web-enabled server. A third computer programmed with a second web-enabled client is provided. A sales information database accessible by the second computer is provided. A plurality of modules is provided at least one module of which is selected from a leads module, a commissions module and a forecasting module. A record object is generated with the at least one module. The record object is automatically routed from the first computer to the third computer.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 8 is a screen image of an exemplary embodiment of a design registration form screen image having a detail tab selected to provide a design registration detail view in accordance with an aspect of the present invention.

DETAILED DESCRIPTION OF THE DRAWINGS

While foregoing is directed to the preferred embodiment of the present invention, other and further embodiments of the invention may be devised without departing from the basic scope thereof, and the scope thereof is determined by the claims that follow.

Figure 1:
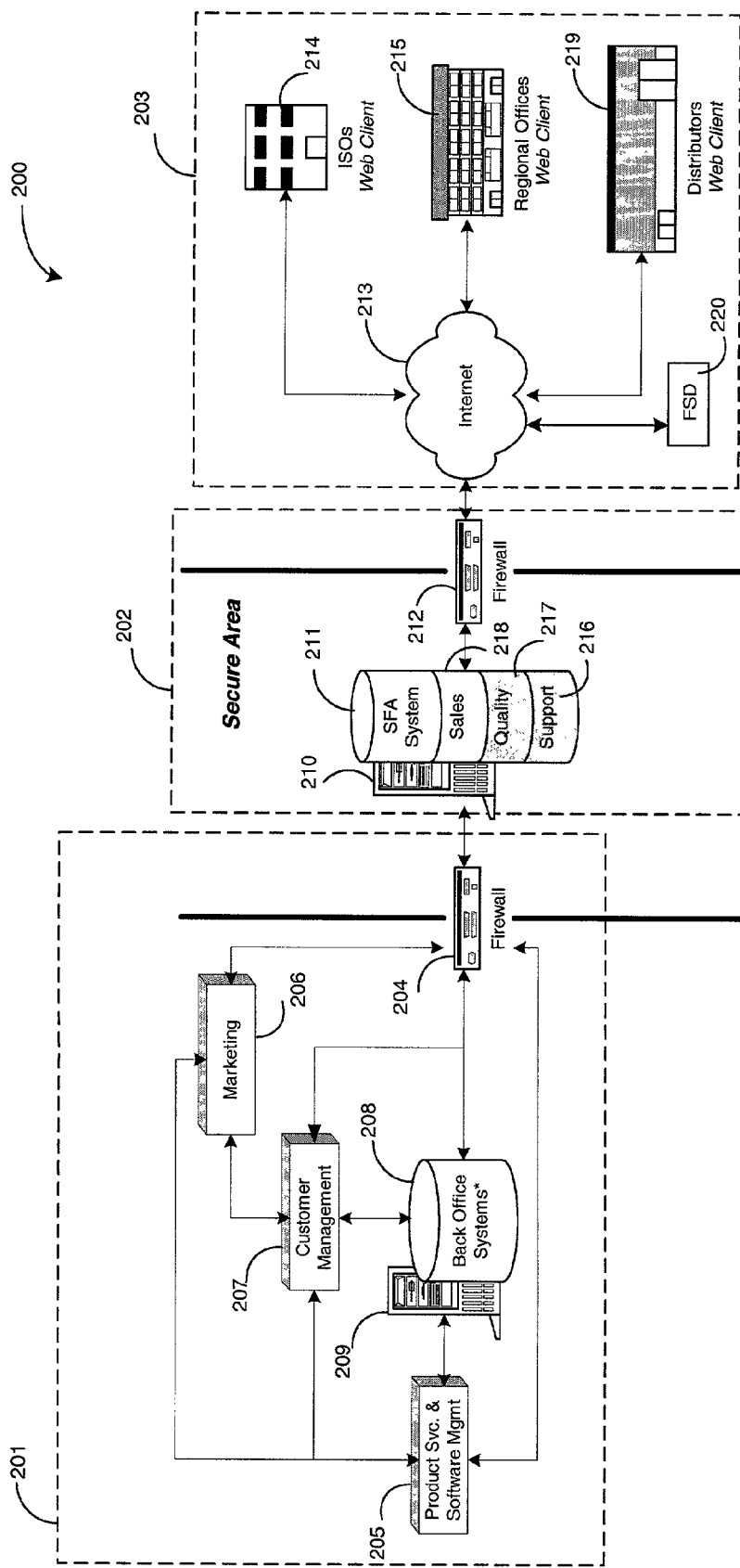
FIG. 1 is a system level diagram of an exemplary portion of an embodiment of data processing network in accordance with an aspect of the present invention.

Referring to FIG. 1, there is shown a system level diagram of an exemplary portion of an embodiment of data processing network 200 in accordance with an aspect of the present invention. Data processing network 200 comprises corporate management subnetwork 201, automated sales subnetwork 202 and distribution subnetwork 203. Corporate management subnetwork 201 comprises computer 209 comprising back office systems 208, operatively coupled to product services and software management 205, customer management 207 and optionally firewall network server 204, which are operatively coupled to marketing 206. By way of example, back office systems 208 may comprise a database or databases for lead sources, campaign names, distributors, sales offices, regional offices and other locations as will become more apparent in view of the following description.

Corporate management subnetwork 201 may be put in communication with automated sales subnetwork 202 through firewall network server 204. Automated sales subnetwork 202 comprises computer 210 and optionally firewall network server 212. Computer 210 may comprise or have access to all or some portion of SFA system 211, sales database 218, quality database 217 and support database 216.

SFA system 211 provides a Web server side for accessing sales data, receiving updated sales data, processing sales data and automatically directing actions to be taken associated with sales data, among other activities described elsewhere herein. SFA system 211 provides a point of entry for sales-related information. Upon receipt of data, SFA system 211 determines delivery location based on origin, type and content of received data, then automatically routes transmission(s) associated with such data to an appropriate resource or system.

Automated sales subnetwork 202 may be put in communication with distribution subnetwork 203 through network server firewall 212 and some portion of the Internet 213. Distribution subnetwork 203 is in communication with some portion of the Internet 213 for networking independent sales organizations (ISOs) 214, regional offices 215, field sales organizations (FSOs) 220 and distributors 219 among other Web clients of automated sales subnetwork 202.

It should be understood that network 200 is described at a high-level depicting interfaces in locations of systems constituting a portion of an infrastructure. Accordingly, many known details have been omitted in order to avoid unnecessarily obscuring the present invention.

Now, with an understanding of data processing network 200, more detail regarding implementation of SFA system 211 is provided. Many of these additional details are described in terms of screen images; however, it will be understood by those of skill in the art of the present invention that such screen images are graphical user interface (GUI) representations of data input and display screens having fields for database organization and input. Such screen images are representations of objects that may be manipulated for purpose of organization, association, storage and communication. Such screen images may comprise selectable commands for creating associations of one object to one or more other objects. SFA system 211 was designed with certain concepts, among which are workflow management, intuitive GUI design, web-based client and ownership.

Workflow management refers to management of work across an organization to achieve a desire result or results. Workflow management should establish standard methodologies, increase productivity and reduce cycle time with automation of request/approval processing.

Intuitive GUI design refers to providing a single workspace view from which all associated tasks may be initialized and utilizing auto-populating or query features to reduce manual processes and errors. A console is provided as a primary user interface, namely, a standard window or view graphical interface from which users may manage and access work in an application.

Figure 2:
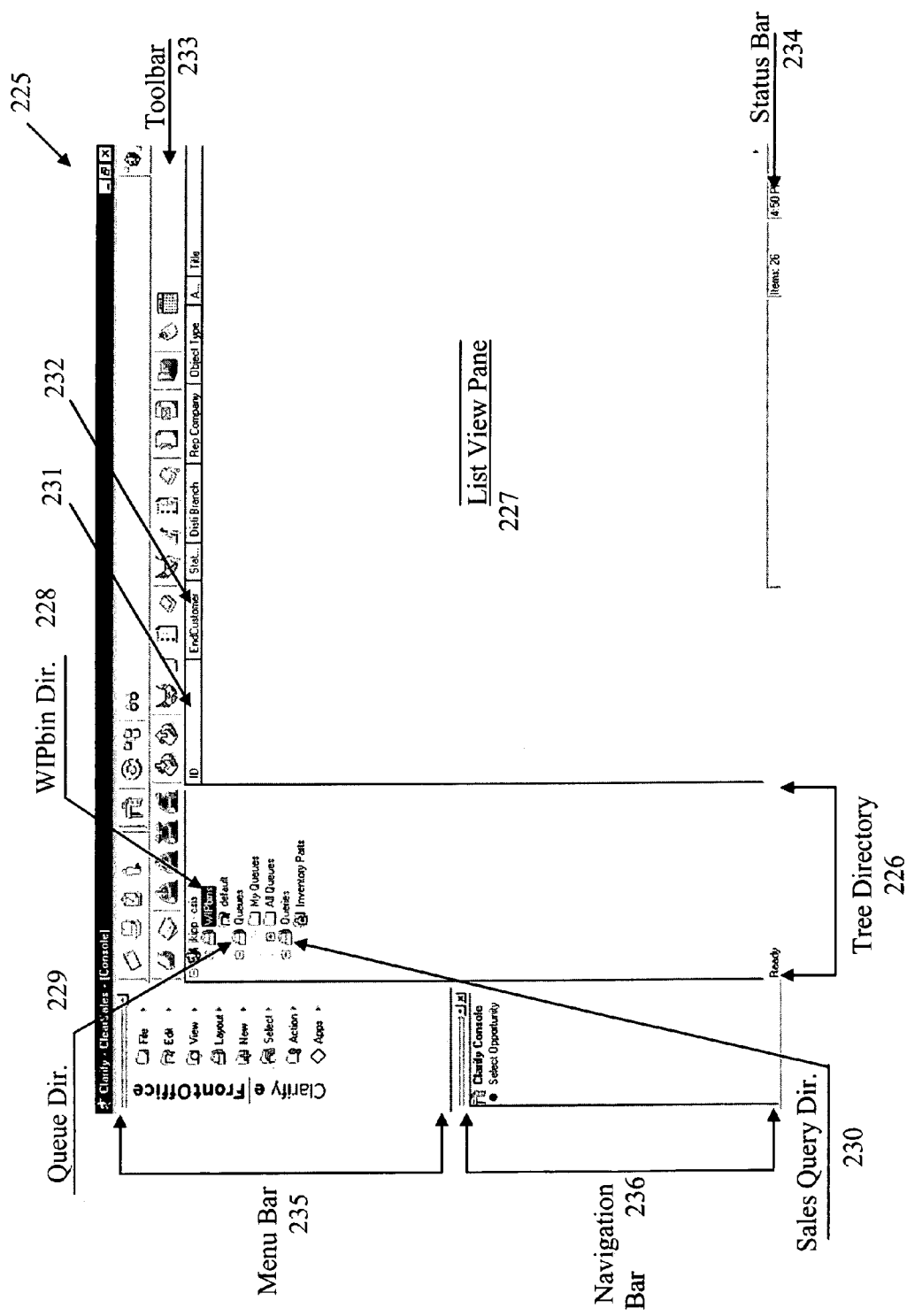
FIG. 2 is a screen image of an exemplary embodiment of a console screen image in accordance with an aspect of the present invention.

Referring to FIG. 2, there is shown a screen image of an exemplary embodiment of a console screen image 225 in accordance with an aspect of the present invention. A tree directory 226 provides an overview of contents accessible via console 225. A hierarchy of directories, which may have one or more folders therein, and folders, which may have one or more items therein, and list view pane 227 is used for display of accessible contents. Information displayed in list view pane 227 depends on user selection made in tree directory 226. Work-in-progress (WIP) bin (WIPbin) directory 228, queue directory 229 and sales query directory 230 are user selectable, as well as folders therein. Folders may be selected by a user for display of items therein in list view pane 227. As users contribute, review or approve items, objects, such as files, flow between users of SFA system 211 via queues and WIPbins. Summary information is displayed in list view pane 227 for each object item or file displayed therein, such summary information includes workflow object type 231 and object record identifier 232. Other summary information may include record title, record age, record status, record expiration date, record condition relative to workflow management, priority or severity. Additionally, toolbar 233, status bar 234, menu bar 235 and navigation bar 236 are provided for user iteration.

Web-based client refers to providing ubiquitous access, rapid deployment and simplified maintenance by use of web-enabling technology. Workflow objects are used to represent clearly defined units of work created and modified by users of system 211. Examples of workflow objects are quotes, design registrations, opportunities, action items, distributor debit authorizations (DDAs) and the like. Workflow refers to movement of work in a form of objects between respective users a recipient of which having an ability to accept responsibility to work or "take ownership" through a course of a process as defined by business rules or policies. Users contribute to movement of work within system 211 by managing movement of workflow objects across their local workspace, such as WIPbins and queues. WIPbin folders are used to store and organize workflow object for which a user has taken or been given ownership. Ownership concept refers to an ability to track, reassign or escalate action items once assigned to or accepted by a user to ensure completion. More particularly, with respect to lead processing, this ownership concept may include automated, categorical assignment of leads to users.

Items in WIPbins are incomplete or pending workflow objects. Though a default WIPbin is provided users may create additional WIPbins to a console. Exchange of ownership takes place when a dispatched workflow object is accepted from a queue into another user's WIPbin. Workflow objects are eliminated from a WIPbin once closed or dispatched.

Queues are temporary holding locations for dispatched workflow objects with system 211. Queues hold workflow objects awaiting routing to an appropriate user. Routing occurs when a workflow object in a queue is assigned or accepted.

Workflow objects may be created and dispatched from one user for viewing and acceptance by another user. A dispatched workflow object will remain in a WIPbin of the dispatcher until accepted by another user. A dispatched workflow object may be rejected or forwarded by an intended recipient. Auto-destination rules may be used for automatically routing such a dispatched workflow object to an appropriate queue. Additionally, a dispatched and accepted workflow object may be yanked from a WIPbin by its dispatcher. In other words, a dispatched and accepted workflow object or an assigned workflow object may be retrieved by a dispatcher or assignor thereof.

An accessed workflow object may be assigned to another with an assign command. Thus, such a workflow object is directly placed in a WIPbin of another bypassing acceptance of a workflow object in such user's queue. Notably, when a dispatched or forwarded workflow object is sent to a queue, in is not necessarily a single user, but rather to all users with access to that particular queue, which, for example, may be defined at a territory or organization level.

Lead Management GUIs

Figure 3:
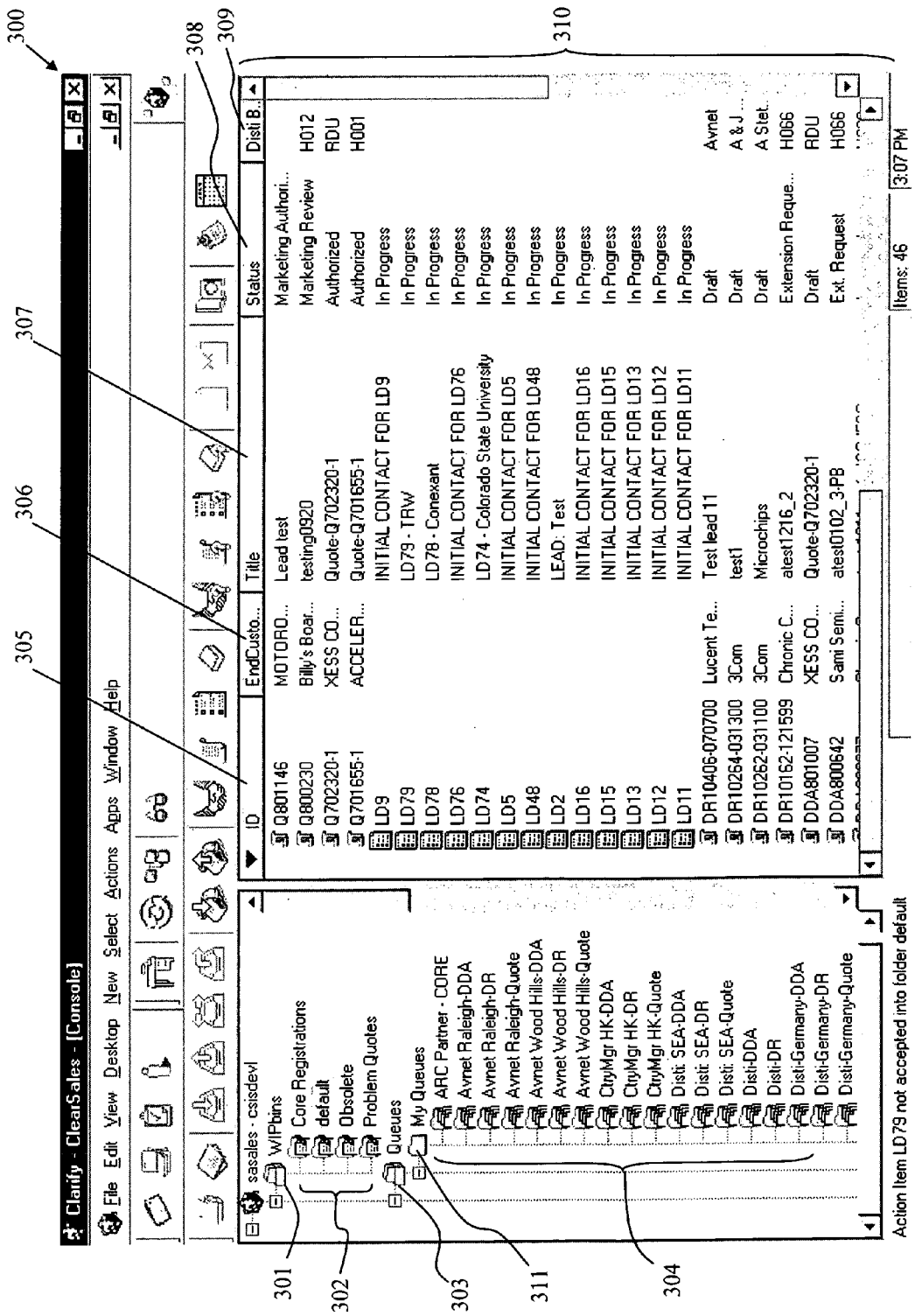
FIG. 3 is a screen image of an exemplary embodiment of a lead action item console image in accordance with an aspect of the present invention.

Referring to FIG. 3, there is shown a screen image of an exemplary embodiment of a lead action item console screen image 300 in accordance with an aspect of the present invention. Console screen image 300 lists WIPbins folder 301, queues folder 303 and action item leads 310. A plurality of subfolders 302 and 311 may be used for additional groupings with respect to folder's 301 and 303, respectively. Files 304 are ISO, FSO or other representative queued leads. Such files 304 may be attached to lead action items 310. Attaching a lead to a lead action item facilitates dispatching it within SFA system 211, as a lead is not a workflow object. Accordingly, by opening lead action item 304, a lead 310 attached to such action item 304 may be determined. To work on a lead 304, it may be dragged and dropped into WIPbin 301 for obtaining ownership or responsibility to work or have another work such a lead.

Lead action items 310 comprise identification 305, an end customer 306, a title 307, a status 308 and a distributor 309. Data for these headings may be located in respective data fields as will become more apparent. Notably, a customer may be selected from a database of customers. Information associated with a customer may include a site record, namely a record of a customer's physical location, and a contact record, namely an individual representing a customer site. A one-to-one relationship may be established between a customer account record and a customer site record, and a one site to one or more contacts may be established as well. Moreover, a contact may be associated with more than one site. Information associated with a customer once entered is automatically used to populate associated customer fields of screen forms for display.

Title 307 of a lead action item indicated lead identification number 305 followed by the name of a site or end customer associated with such a lead. A lead identification number 305 begins with "LD" followed by a system-generated number. Using system-generated numbers provides at least an approximately chronological ordering of leads as numbers are sequentially assigned. However, leads may be grouped and provided for lead identification every three months.

Figure 4A:
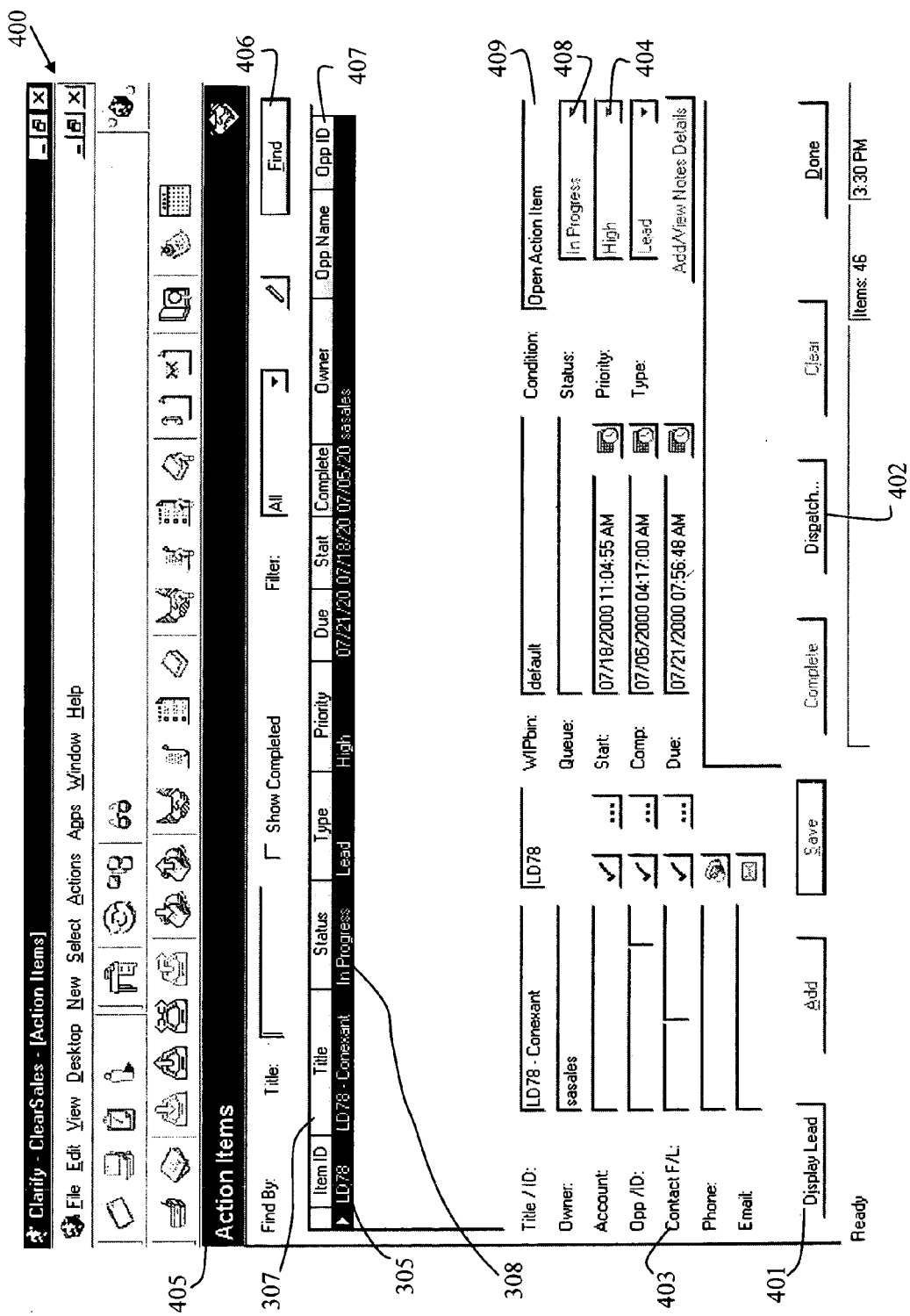
FIG. 4A is a screen image of an exemplary embodiment of a lead action item form screen image in accordance with an aspect of the present invention.

Referring to FIG. 4A, there is shown a screen image of an exemplary embodiment of a lead action item form screen image 400 in accordance with an aspect of the present invention. Lead action item form screen image 400 comprises display lead button 401 and dispatch button 402. At which point, a representative can obtain data regarding such a lead by clicking display lead button 401, accept such a lead and dispatch such a lead to a distributor.

Dispatch button allows an ISO, FSO or other representative to forward a lead to a distributor of choice. Leads are transmitted using a lead action item object and have a priority indicated in priority field 404. Notably, for convenience a find by title field 405 and filter field 406 are part of lead action item form screen image 400, and thus by clicking on find button 407 a user may search for lead action items without having to pull down or otherwise actuate any other menu.

Condition field 409 is to note state of a lead action item, for example open or closed. Status field 408 is to note status of a lead, for example authorized, marketing review, in progress, draft or extension requested. Contact field 403 is to indicate a first and last name (F/L) for a person to contact regarding such lead, such as an employee of a current or potential customer.

Figure 4B:
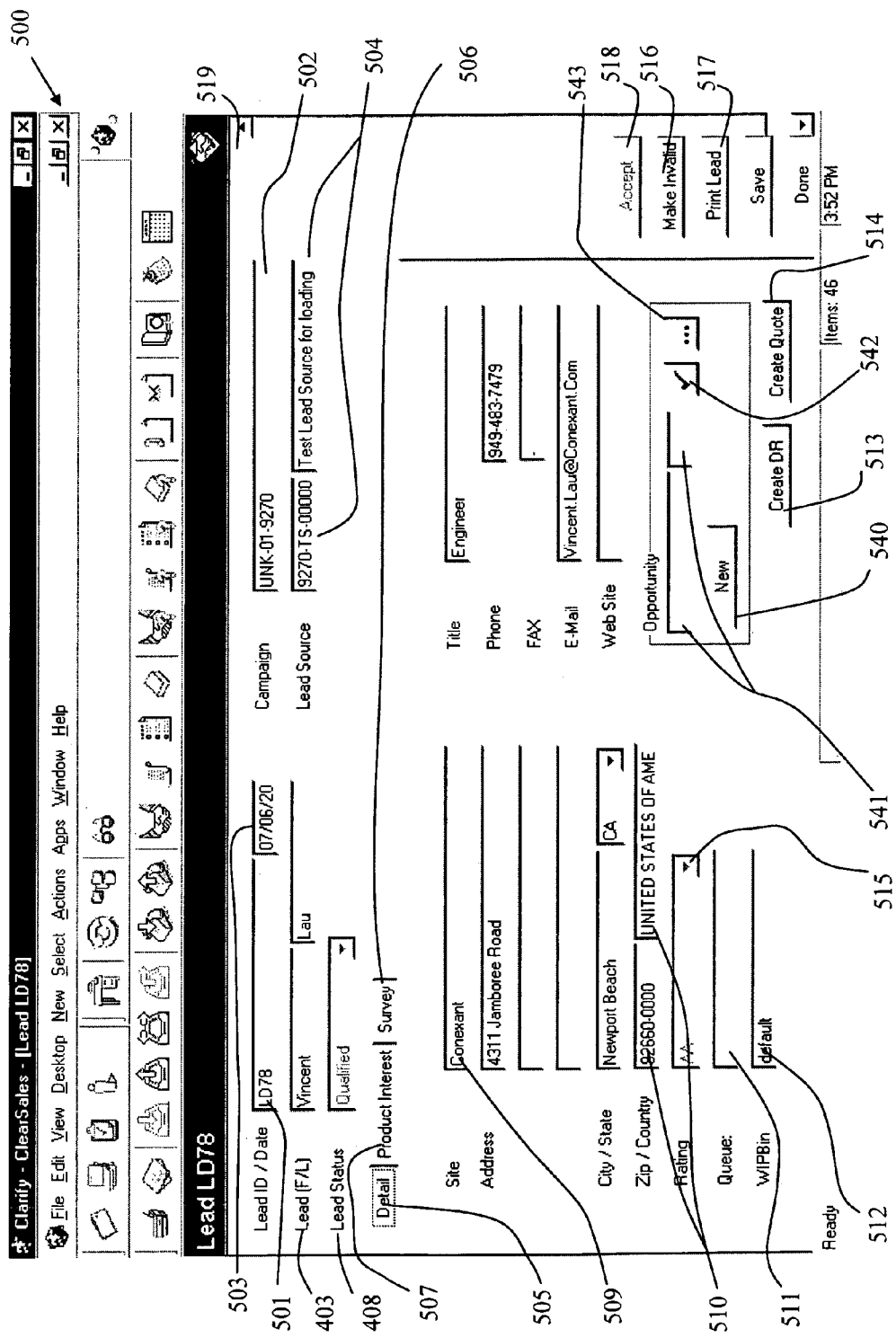
FIG. 4B is a screen image of an exemplary embodiment of a lead form screen image for a lead having detail tab selected to provide a lead detail view in accordance with an aspect of the present invention.

Referring to FIG. 4B, there is shown a screen image of an exemplary embodiment of a lead form screen image 500 for a lead having detail tab 505 selected to provide a lead detail view in accordance with an aspect of the present invention. As mentioned elsewhere herein, a lead object comprises a header section 519 and three tabs, as indicated by reference numbers 505-507. Lead identification field 501 comprises "LD" followed by a unique lead identifier number. Date field 503 is a date assigned by SFA system 211 shown in FIG. 1, namely, a date such lead was captured by SFA system 211. Campaign field 502 is for a marketing effort associated with such a lead, and may further be associated to at least one offered product or product division. Lead source fields 504 provide a sub-level under campaign and refer to marketing activity generating such a lead. Examples of lead sources are specific ads, tradeshows, promotions and the like. By tracking leads by campaign and lead source, success of marketing efforts may be measured as viewed by the number and value of opportunities generated by such efforts, which additionally may be compared to cost of such campaign and lead source for a return on investment analysis.

Detail tab 505 provides a site field 509 to indicate a customer or other site name. Leads are sent to a representative's lead queue base on country and/or zip code of lead, and thus zip/country fields 510 provide room for such information. Queue field 511 and WIPbin field 512 provide subfolder 311 and 301 information, respectively. Rating field 515 comprises a pull down menu for selecting a rating for a registration or a quote. Ratings may be based on timing of a project and/or potential volume to be purchased. Accept button 518 is active prior to taking ownership of a lead. For example, by right-clicking on a lead with a cursor-pointing device thus invoking lead form screen image 500, accept button 518 will be shown as selectable, where ownership of such a lead may be taken by clicking on accept button 518. This is an alternative process to the above-described drag and drop method.

Create design registration button 513 and create quote button 514 allow a user to create registrations and quotes, respectively. If a lead has been accepted by a distributor, for example, and such lead results in a registration or a quote, the distributor opens an associated lead work object from WIPbin 301 shown in FIG. 3, and then clicks on create registration button 513 or create quote button 514, as applicable. By clicking on a button 513 or 514, a corresponding registration or quote form screen (each of which is shown below) will appear. The distributor then completes such a form. Upon actuating either button 513 or 514, a lead source associated with such lead is stored in a database.

If a lead is found to be invalid, a user may select make invalid button 516. Changing status of a lead to invalid may be due to inability to make contact with a lead contact person, gain of such a sale would not justify the effort, among other reasons. Print lead button 517 allows a user to print information about a lead, and is especially useful when a sales representative once to forward a lead to an outside sales representative, namely, a representative that does not have on-line access to SFA system 211.

With continuing reference to FIG. 4B, lead detail view comprises new opportunity button 540. If a representative creates a selects new opportunity button 540, then lead status resulting in a design registration or quote is updated to "Attached-Primary" and is indicated in lead status field 408. Such a new opportunity is identified in opportunity fields 541 by name and number, and buttons 513, 514, 540 and 542 are de-activated. "Attached-Primary" means that a lead source that generated such a lead, resulting in a representative creating a new opportunity from such design registration or quote, gets credit for all sales associated to that opportunity. This facilitates marketing efforts for evaluation and comparison of effectiveness of marketing activities, namely, each lead source may be discretely associated with actual sales revenue generated from or in response to such lead source.

If, however, a lead work object is attached to an existing opportunity, then lead status resulting in a design registration or quote is updated to "Attached-Secondary" as indicated in field 408. "Attached-Secondary" means that a lead source that generated such a lead, resulting in a representative creating a design registration or quote for an existing opportunity, will not get credit for any sales associated to that opportunity. This too facilitates marketing efforts for evaluation and comparison of effectiveness of marking efforts, namely, which lead sources were not effective in generating new opportunity revenue. In sum, a lead that has Attached-Primary status has potential to generate new business, where a lead that has Attached-Secondary status does not.

A lead work object is attached to an existing opportunity by selecting checked button 542. In response to clicking button 542, a list of existing opportunities will appear. By selecting an existing opportunity from such list, the selected opportunity is attached to the lead work object. Lead status field 408 is updated to indicate Attached-Secondary; such an existing opportunity is identified in opportunity fields 541 by name and number; and buttons 513, 514, 540 and 542 are de-activated. Etcetera or " . . . " button 543 is a go to button for retrieving a record for a value entered in a go to button associated field, in this example information on a selected existing opportunity.

Forecasting GUI

Figure 5:
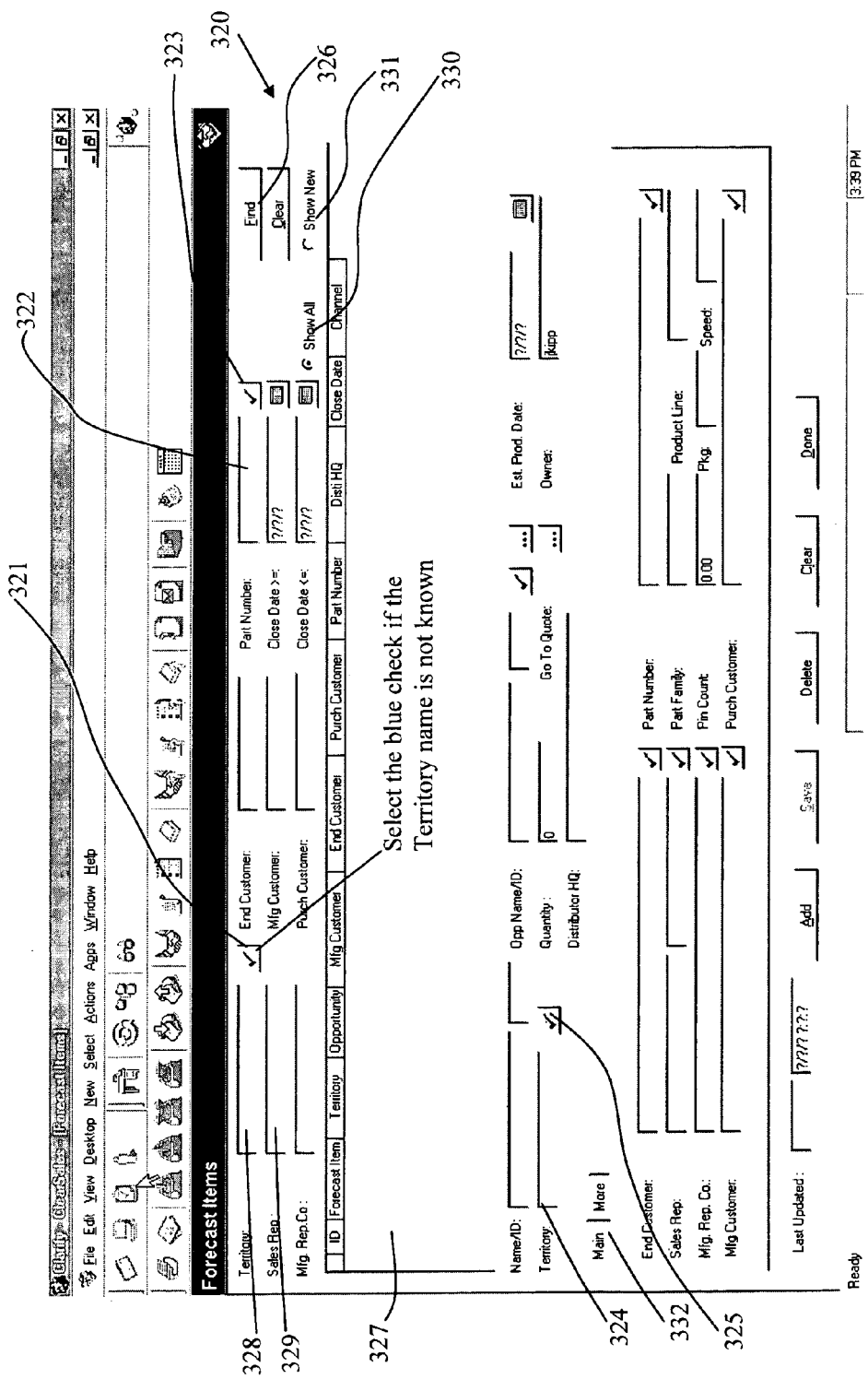
FIG. 5 is a screen image of an exemplary embodiment of a forecast item form screen image in accordance with an aspect of the present invention.

Referring to FIG. 5, there is shown a screen image of an exemplary embodiment of a forecast item form screen image 320 in accordance with an aspect of the present invention.

Forecast item form screen image 320 is a GUI. Forecasts are created in SFA system 211 (shown in FIG. 1) by automatic and systematic processing of quotes for forecasting and creation of forecast reports. With continuing reference to FIG. 5 and renewed reference to FIG. 1, as quotes are approved, system 211 checks each quote to determine if it is forecastable based upon a predetermined criteria. System 211 compares a part number, such as indicated in field 322, obtained from a quote line item. Forecastable parts may be identified by a list of associated part numbers provided by marketing. Accordingly, if a part number on such a list matches a part number from a quote line item, then system 211 automatically selects part number select or check button 323. In response to selecting button 323, a forecast item is created in a forecast item database table. Alternatively, system 211 can automatically check for a minimum quantity threshold of sales revenue for some defined period of time for purposes of checking quote line items for forecasting.

When "include in forecast button" or check button 323 is selected, a forecast item row is created in a forecast item database table. To view a forecasted item, forecast item form screen image 320 is provided in response to a select forecast item menu user command. Forecast item form screen image 320 comprises territory field 324, from which a territory from a list of territories may be selected. Such a listed is provided in response to selecting territory check button 325.

Opportunity Management GUI

Figure 6A:
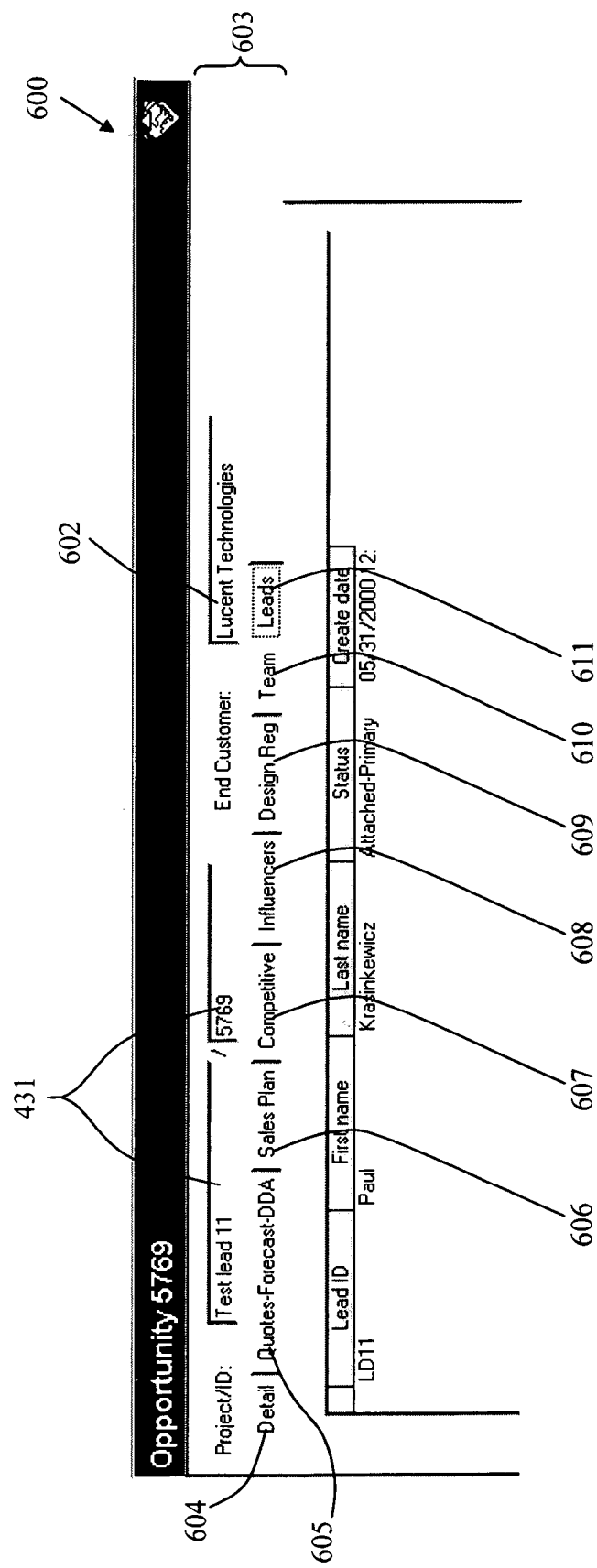
FIG. 6A is a portion of a screen image of an exemplary embodiment of an opportunity item form screen image in accordance with an aspect of the present invention.

Referring to FIG. 6A, there is shown a screen image of an exemplary embodiment of an opportunity item GUI screen image 600 in accordance with an aspect of the present invention. Opportunity item GUI screen image 600 comprises project identification fields 431 and end customer field 602 in header section 603, as well as eight tabs, namely, detail tab 604, quote-forecast-DDA tab 605, sales plan tab 606, competitive tab 607, influencers tab 608, design registration tab 609, team tab 610 and leads tab 611. Leads tab 611 is illustratively shown as having been activated or selected for providing information on a lead.

Figure 6B:
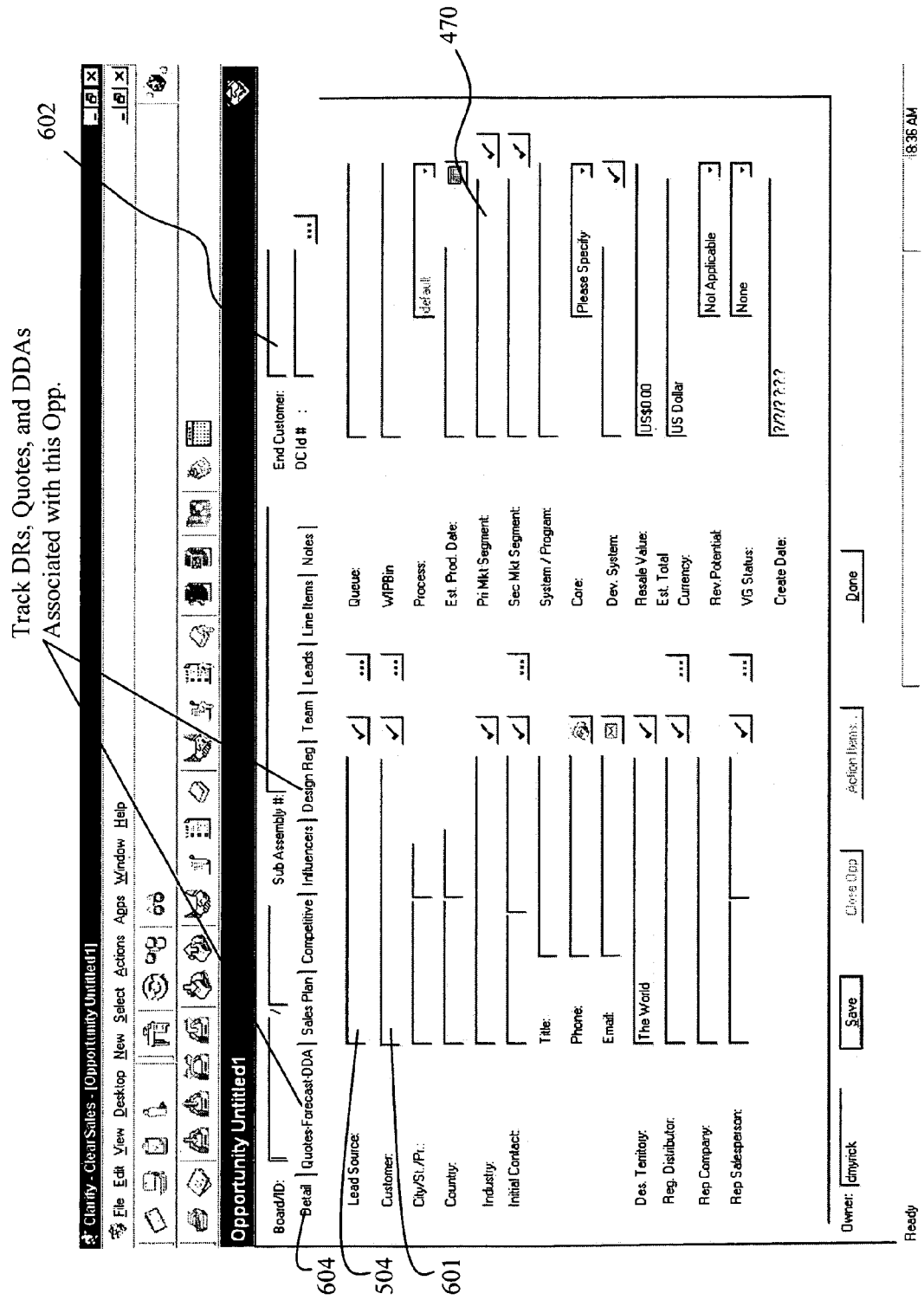
FIG. 6B is a screen image of an exemplary embodiment of an opportunity item screen image having detail tab fields displayed in accordance with an aspect of the present invention.

Referring to FIG. 6B, there is shown a screen image of an exemplary embodiment of an opportunity item GUI screen image 600 having detail tab 604 selected for display of fields associated therewith in accordance with an aspect of the present invention. Detail tabl fields comprise lead source field 504, customer field 601 (which may be different than an end customer, especially when dealing with large entities with multiple divisions) and application field 470, among other fields.

An opportunity object within SFA system 211 is used to tie other objects together and provide an historical connection for management reporting. Attaching one or more quotes or design registrations to an opportunity allows users to evaluate different business opportunities, such as how many design registrations lead to quotes and what quotes lead to sales, among other examples. An opportunity provides a nexus for all business related to such opportunity, regardless of geographic location or parties entering into a deal associated with the opportunity. Moreover, all quotes or design registrations for a deal may be found based on the opportunity associated therewith. Additionally, leads may be tracked as associated with an opportunity. Attaching opportunities is described elsewhere herein with respect to Attached-Primary and Attached-Secondary.

Quote Management GUI

Figure 7A:
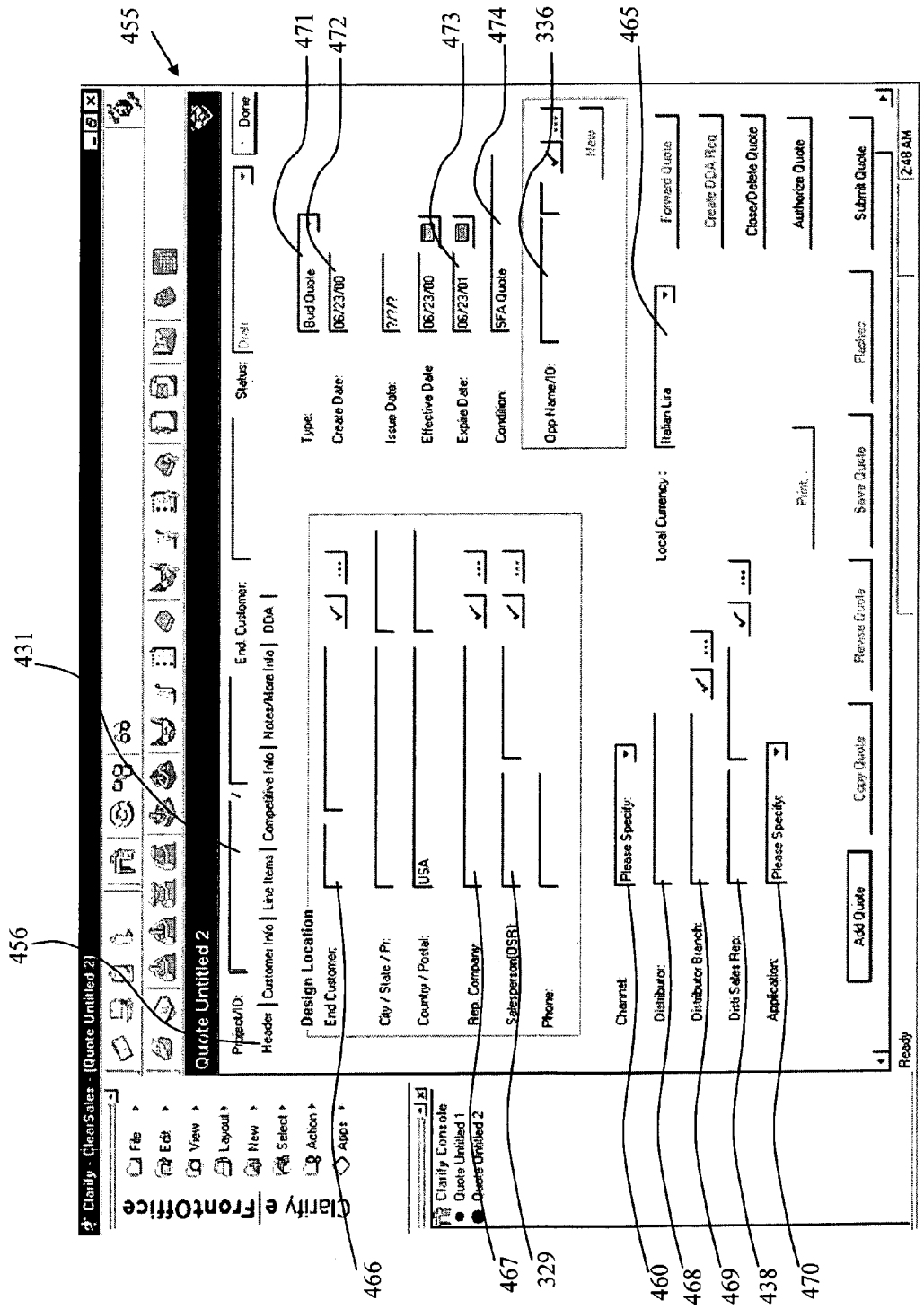
FIGS. 7A, 7B and 7C are screen images of an exemplary embodiment of a quote form screen image having different tab fields displayed in accordance with an aspect of the present invention.
Figure 7B:
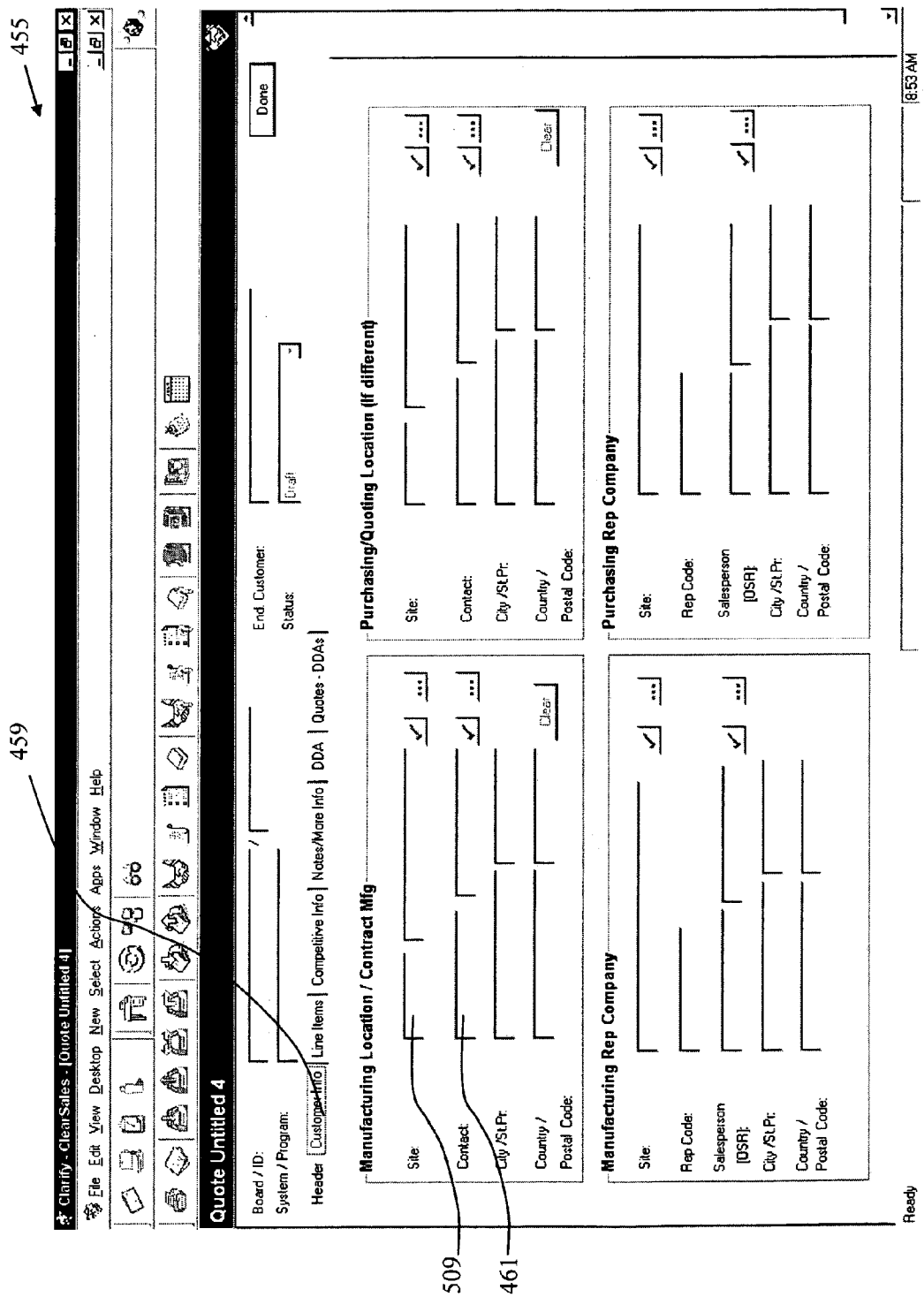
Figure 7C:
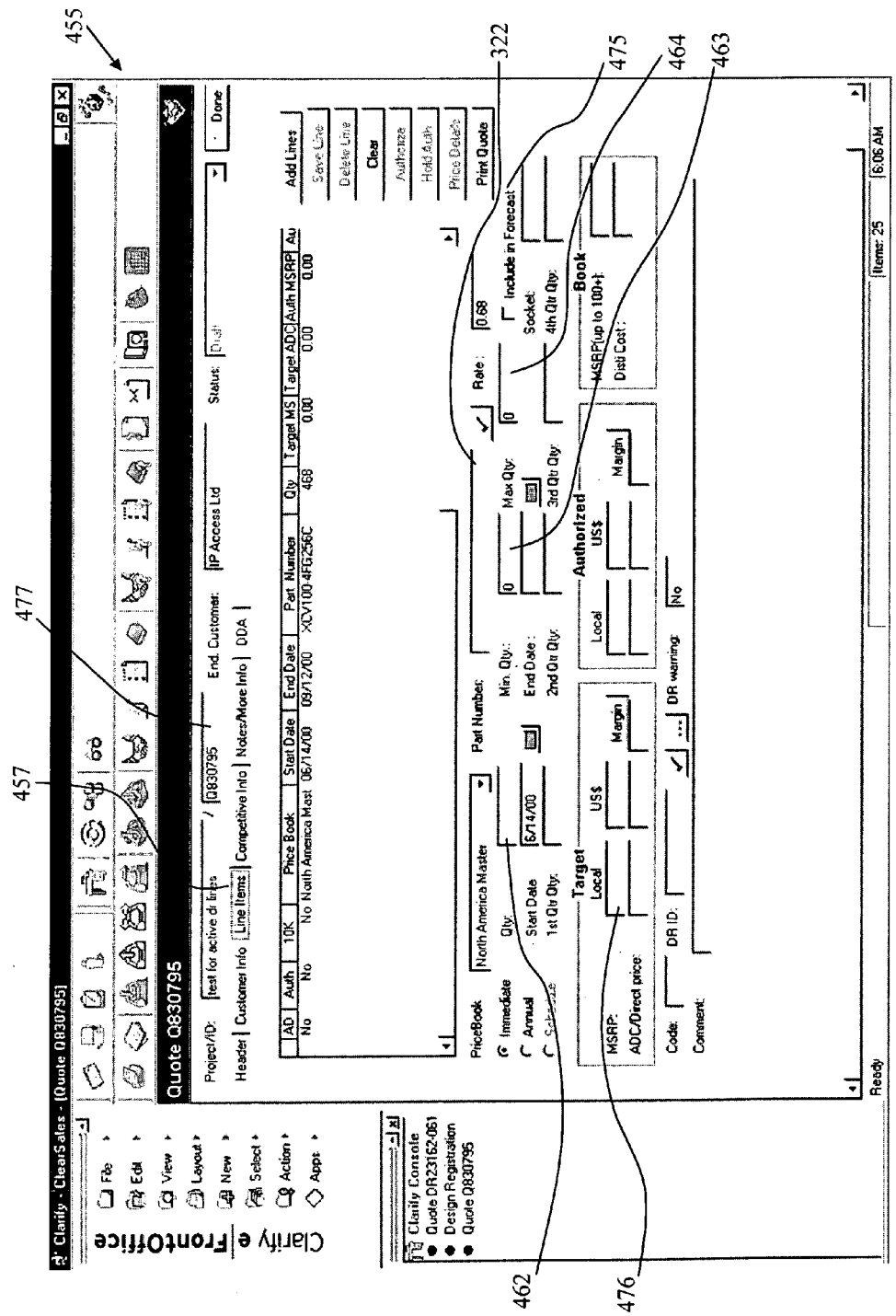

Referring to FIG. 7A, there is shown a screen image of an exemplary embodiment of a quote form screen image 455 in accordance with an aspect of the present invention. Quote form screen image 455 is shown with header tab 456 fields displayed. Referring to FIG. 7B, there is shown a screen image of an exemplary embodiment of a quote form screen image 455 having customer information tab 459 fields displayed in accordance with an aspect of the present invention. Referring to FIG. 7C, there is shown a screen image of an exemplary embodiment of a quote form screen image 455 having line items tab 457 fields displayed in accordance with an aspect of the present invention.

Referring to FIGS. 7A, 7B and 7C, quote form screen image 455 comprises project identification field 431. With continuing reference to FIGS. 7A, 7B and 7C and renewed reference to FIG. 1, when a quote is submitted via SFA system 211, it is automatically routed to an appropriate chain of people for approval regarding pricing. This routing may depend on whether the quote is an in-territory quote or an out-of-territory quote, or whether quoted pricing is above or below a set threshold. An in-territory quote is one where design location territory and manufacturing location territory are the same. An out-of-territory quote is one where design location territory and manufacturing location territory are not the same. A quote may be placed in a default WIPbin. Information for a quote may comprise currency 465, end customer name 466, project identification 431, company representative 467, salesperson 429, channel (such as direct and distribution) 460, distributor (if any) 468, distributor branch (if any) 469, distributor sales representative 438, customer application 470, type of quote 471, creation date 472, expiration date 473, condition 474, quantity 462, part number 322, include in forecast 475, price 476, design registration identification 477, min. and max. quantities 463 and 464, opportunity name and opportunity identification 336, among other types of information. It should be understood that some information need only be entered once on a system, and then is available for subsequent quotes, as well as other types of sales activities. Moreover, tables of selectable items may be used to expedite quote generation.

Design Registration GUI

In FIG. 8, there is shown a screen image of an exemplary embodiment of a design registration form screen image 430 having a detail tab 433 selected to provide a design registration detail view in accordance with an aspect of the present invention. A design registration may be created by a distributor as a record of their involvement with a customer project, and facilitate protection of margin on subsequent sales related to such a customer project. A design registration is submitted to a local representative or a field sales coordinator for review and approval. There are two types of design registrations ("DRs"), namely, a design DR for a project in an early design phase and a production DR for a project being finalized for production.

Design registration form screen image 430 comprises a header section 440 and three selectable tabs, namely detail tab 433, line items tab 434 and notes tab 435. Header section 440 comprises project identification field 431 and distributor branch field 432. Detail tab 433 comprises distribution sales person field 438, and distribution field application engineer (FAE) field 439. Design registration form screen image 430 further comprises show lead button 436 to go to a lead object screen image and view activity log button 437 to go to an activity log regarding a lead associated with such design registration.

Commissions Management GUI

Figure 9A:
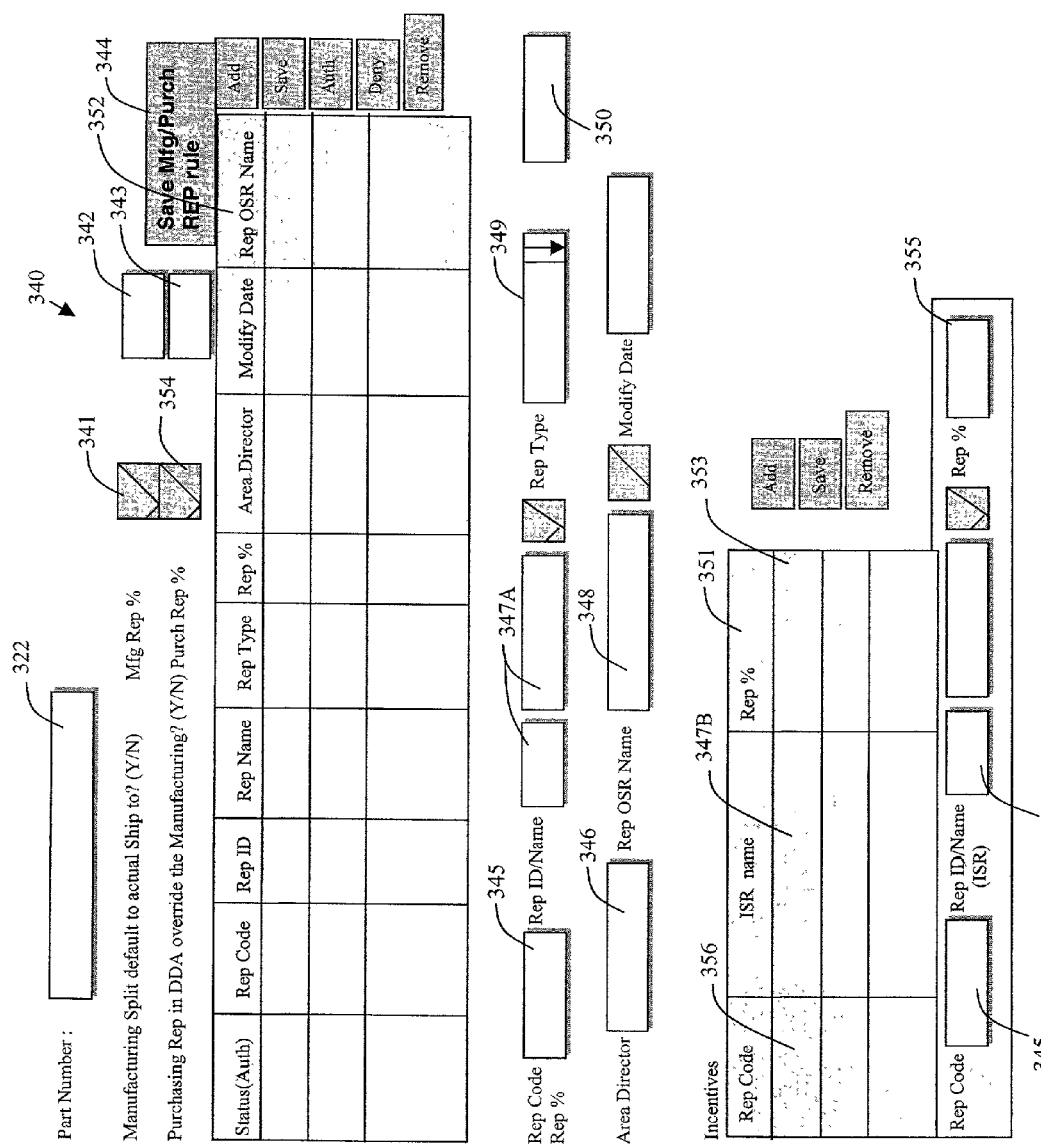
FIG. 9A is a screen image of an exemplary embodiment of a design credit or commission form screen image in accordance with an aspect of the present invention.

Referring to FIG. 9A, there is shown screen image of an exemplary embodiment of a design credit or split commission form screen image 340 in accordance with an aspect of the present invention. Design credit form screen image 340 comprises part number field 322, manufacturing split default button 341, purchasing representative in distributor debt authorization (DDA) override button 354, manufacturing representative percentage field 342, purchasing representative percentage field 343, save mfg./purch. representative rule button 344, representative information matrix 352, representative code field 345, representative identification and name fields 347A, representative type field 349, representative percentage field 350, area director field 346, representative outside sales representative name field 348 and incentives section 351. Incentives section 351 comprises representative code fields 345, inside sales representative identification and name fields 347B, representative identification and name fields 347A, and representative percentage fields 352.

Figure 9B:
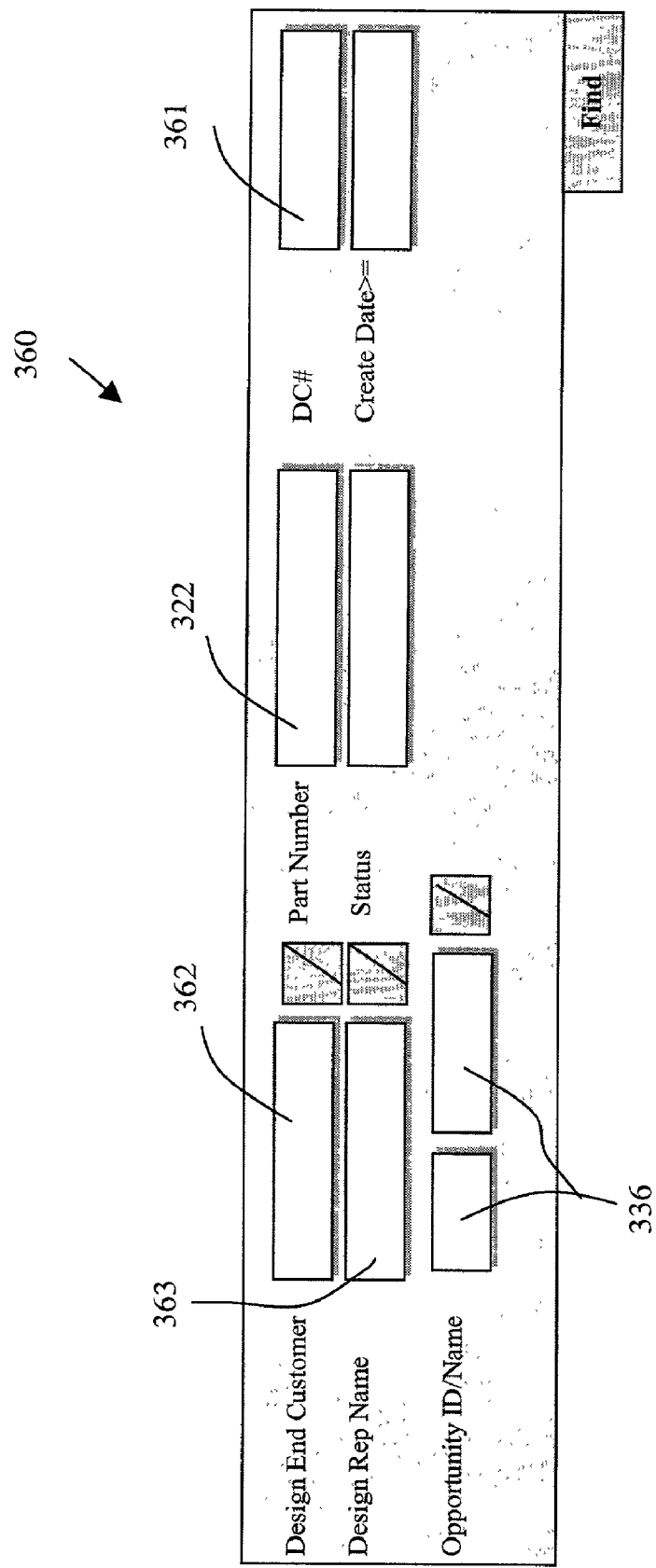
FIG. 9B is a screen image of an exemplary embodiment of another design credit or commission form screen image in accordance with an aspect of the present invention.

Referring to FIG. 9B, there is shown screen image of an exemplary embodiment of another design credit form screen image 360 in accordance with an aspect of the present invention. Design credit form screen image 360 comprises part number field 322, design credit number field 361, design customer field 362, design representative name field 363, and opportunity identification and name fields 336.

Referring to FIGS. 9A and 9B, opportunity fields 336 are used to connect a design credit number in field 361 with an opportunity. Design credit refers to a sale associated with a part number as appearing in field 322. A manufacturing split commission default button 341 may be selected to cause default percentages to appear in manufacturing representative percentage field 342 and purchasing representative percentage field 343. A purchasing representative in DDA override button 354 may be selected to override the percentage appearing in field 343 owing to selection of button 341. Thus, a percentage may be entered in field 343. Alternatively, percentages may be directly entered into fields 342 and 343. Notably, upper or lower limits may be set for entries into fields 342 and 343. A save button 344 may be selected to save manufacturing/purchasing representative split commission percentages as input into fields 342 and 343. Representative code field 345, representative identification/name fields 347A, representative percentage field 350 and representative type field 349 are associated with one another. Thus, a percentage may automatically appear in field 350 for a particular representative or representative type. An area director may appear in field 346 as associated with a representative identified in fields 347A. An outside sales representative (OSR) name field 348 is used to identify an OSR associated with a design credit activity. Incentives section 351 allows incentive percentages to be entered or appear in fields 353 and 355. Representative code 356, inside sales representative ID/name fields 347B and representative percentage 353 are associated with one another. If a representative as indicated in fields 347A is different from that indicated in fields 347B, then associated fields 345, 347A and 355 of incentive section 351 may be used too.

Forecasting

Figure 10:
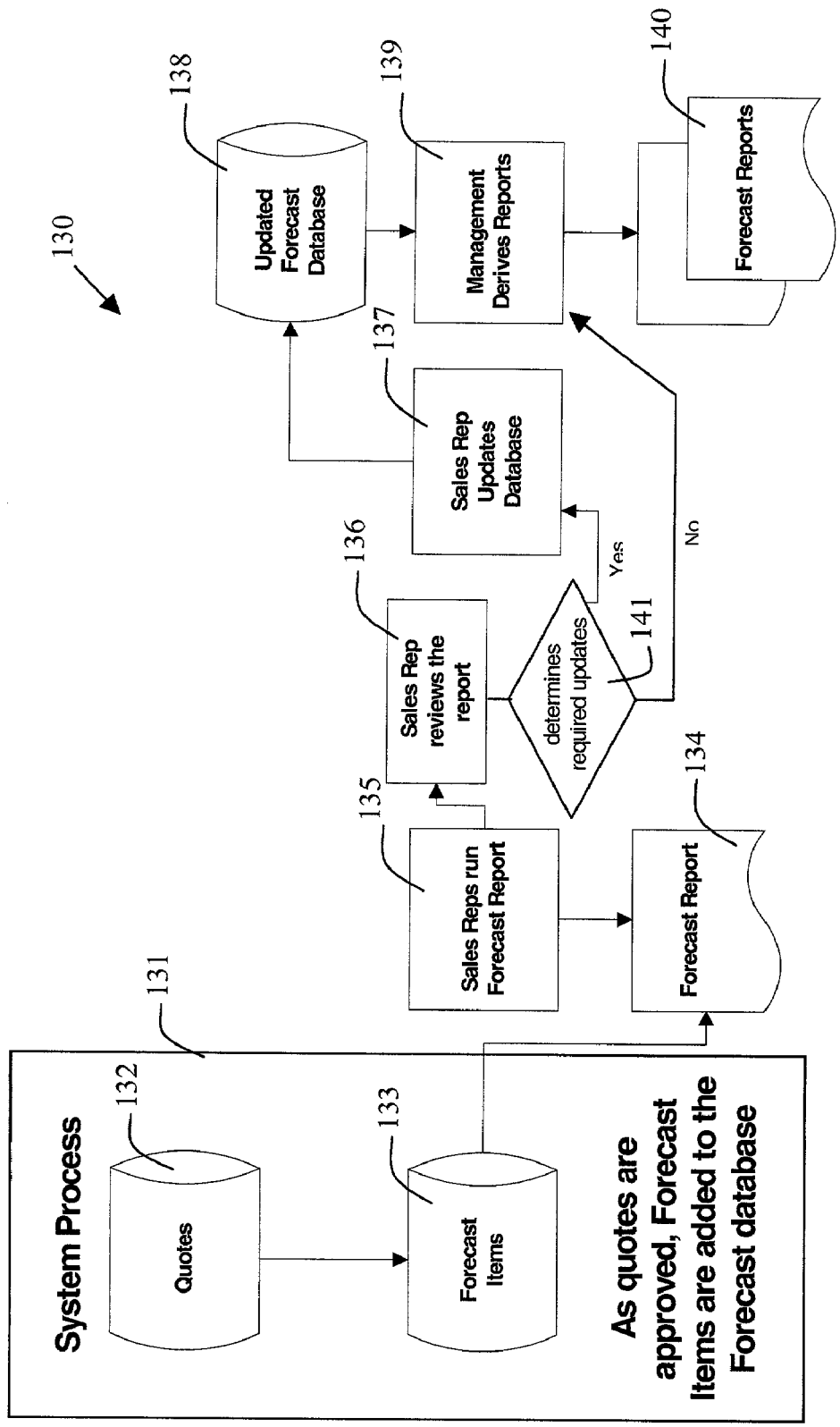
FIG. 10 is a flow diagram of an exemplary embodiment of a forecast items process in accordance with an aspect of the present invention.

Referring to FIG. 10, there is shown a flow diagram of an exemplary embodiment of a forecast items process 130 in accordance with an aspect of the present invention. Forecast items system 130 comprises quote approval system 131.

Quotes database 132 comprises quote line items. Quote line items stored in quotes database 132 are copied or otherwise moved over into forecast items database 133, or more particularly a forecast items database table 133. Forecast items database table 133 and quotes database 132 may be a part of SFA system 211 (shown in FIG. 1). Not all quote line items need be copied, but rather may be moved over into forecast items database table 133 based on a criteria, such as a quoted line item is for parts considered to be so new that no demand model may be created or for parts sufficiently mature as to meet a minimum annual quarterly threshold in sales revenue. A newness threshold is dependent upon the part type. A minimum annual quarterly threshold in sales revenue will depend upon the part type. Such quote line items once moved over to a forecast table become forecast line items.

Forecast line items are provided to a reporting application 134 to generate forecast reports. At step 135, sales representatives may run forecast reports based on forecast line items. Reporting application 134 may be used for step 135 and may comprise a portion of SFA system 211 (shown in FIG. 1). Such reports may be based on end customers within a sales representatives territory. Alternatively, sales representatives may review forecast items based on end customers directly on SFA system 211 (shown in FIG. 1) without creating a report. Sales representatives may record forecast quantities, for example for a current quarter, using SFA system 211 (shown in FIG. 1).

At step 136, a sales representative reviews a forecast report. At step 141, it is determined if any updates are required to any forecast line items for such a forecast report by such sales representative. If there is to be updating, such sales representative provides updating for forecast items at step 137, and at step 138 forecast items database table 133 is updated. If it is determined that there is no updating to be done at step 141 or after updating forecast items database table 133 at step 138, at step 139 management receives forecasted items, including any updates, to derive reports therefrom. At step 140, forecast reports, including any updates, may be produced in accordance with management directives. Such reports may be used as operations product forecasts.

Lead Processing

Figure 11:
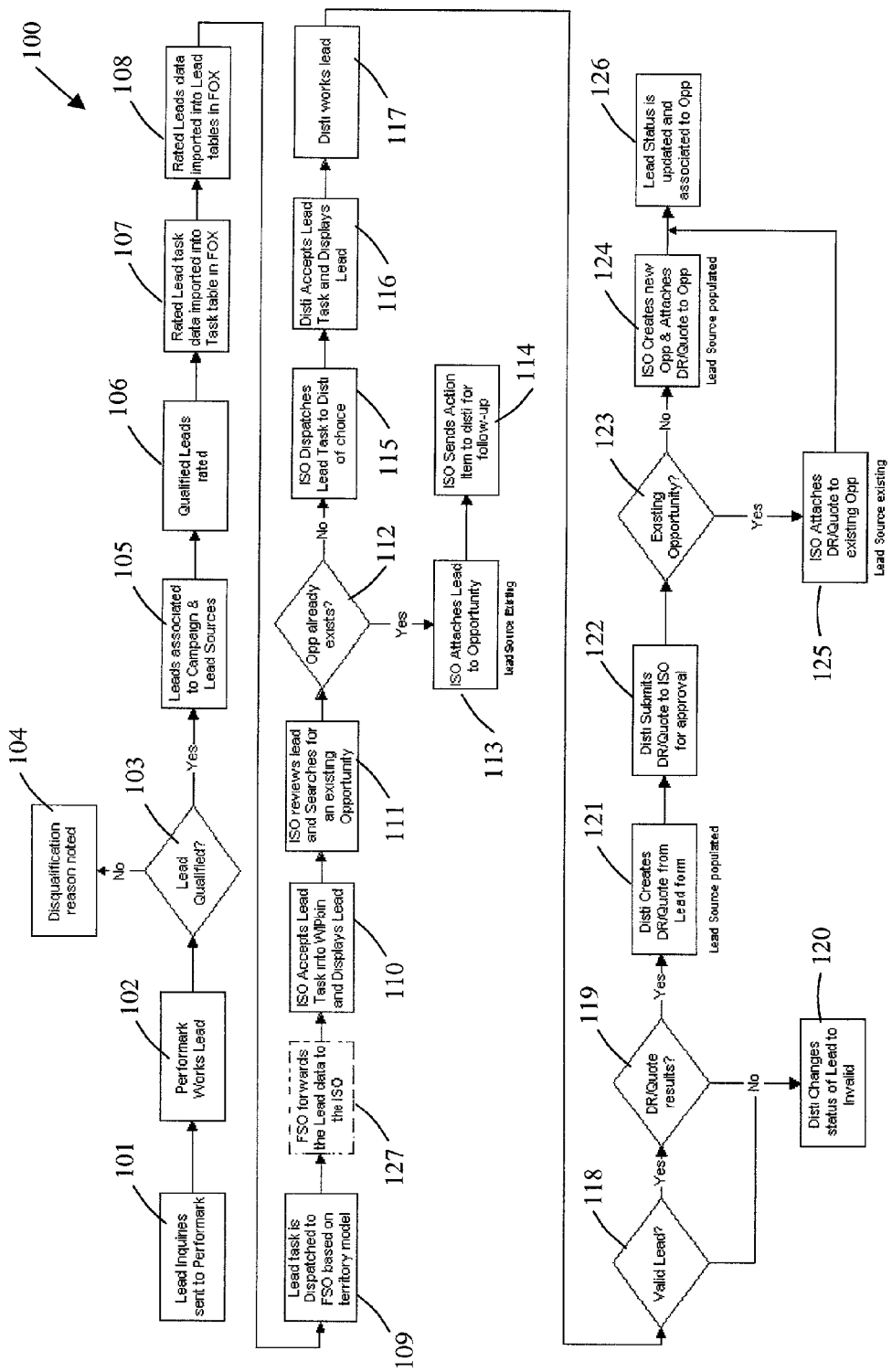
FIG. 11 is a flow diagram of an exemplary embodiment of lead process in accordance with an aspect of the present invention.

Referring to FIG. 11, there is shown a flow diagram of an exemplary embodiment of lead process 100 in accordance with an aspect of the present invention. Lead process 100 describes how leads are qualified and disseminated to field representatives after lead inquires are received at step 101. Lead status is systematically updated based on how a lead is acted upon. This systematic processing facilitates corporations to know what percentage of leads are followed up on by field representatives, what percentage of leads result in business and like information.

At step 101, lead inquiries are passed from any of a plurality of data sources for lead qualification to a lead data gathering organization. A company may be hired to receive such leads, as a lead qualification agency, for passing on to the hiring company to which such leads are ultimately to be directed. At step 102, each lead inquiry is analyzed for purposes of completeness and qualification. For purposes of clarity of explanation, the remainder of FIG. 1 is described in terms of processing a single lead though multiple leads may be process simultaneously.

At step 103, it is determined if a lead is qualified. If a lead is not qualified at step 103, the reason(s) for non-qualification are noted at step 104. If a lead is qualified, then at step 105 such a lead inquiry or lead is associated with a lead source and a campaign from lists of valid lead sources and campaign names, which may be provided from a marketing department. At step 106, such qualified lead is rated. Examples of such ratings are AAA, AA, A or B leads. Another company hired to receive such leads may enter rating information prior to passing such a qualified lead to the hiring company, or rating information may be collected and entered directly by the hiring company.

At step 107, qualified, rated lead data for the lead is imported into a lead information database in communication with or having an association with a sales force automation system. This database may comprise an action item table and lead tables. At step 107, lead follow-up activity information is loaded into such action item table. At step 108, rated lead data is imported into such lead tables. Associated lead contact and product interest information is loaded into such lead tables.

At step 109, a lead task is dispatched to a sales organization lead queue, such as an ISO, a FSO, or one or more other representatives. Dispatching may be done based on an existing territory model. Optionally, a step 127 may be used where an FSO forwards lead data to an ISO for receipt at step 110. At step 110, an ISO, FSO or other representative accepts such a lead task into a WIPbin. A representative may display lead data by clicking on a web page or other computer screen display button for a lead action item form. For purposes of clarity of explanation, it is assumed that the representative is an ISO for the remainder of description of FIG. 11 though other representatives may be used. At step 111, an ISO retrieves lead information and searches for an existing opportunity. For example, an ISO may search for an existing opportunity if it is believed that an opportunity within a sales force automation system already exists.

At step 112, it is determined whether an opportunity already exists. If an opportunity already exists, at step 113 an ISO attaches a lead being worked to such an existing opportunity by selecting such existing opportunity into a lead action item form for the lead. Because there is an existing opportunity, a lead source associated with the lead being worked already exists in the database.

At step 114, an ISO sends such lead action item form to an already lead-associated distributor for follow-up. Such a distributor may already be associated with such leads based on type, location, among other classifications and the like. However, if an opportunity does not already exist or is not found at step 113, then an ISO dispatches a lead action item form to a distributor of choice. Such a distributor may be selected based on lead type, location, among other classifications.

At step 116, a distributor accepts a lead action item associated with a lead action item form received. A distributor may display lead data by clicking on a web page or other computer screen display button for a lead action item form. At step 117, a distributor works the lead. At step 118, the distributor determines if the lead is a valid. If a lead turns out to be invalid, a distributor working such a lead updates its status to invalid at step 120.

At step 119, it is determined if a registration or a quote results from a lead. If a registration or a quote results from a worked lead form, a distributor creates a registration or quote object from such a lead form at step 121; otherwise, a distributor working such a lead updates its status to invalid at step 120. To create such an object, a distributor may click on a create registration or quote button, as applicable, and in response thereto a new registration or quote form, as applicable, will appear. After completing data fields within a registration or quote form, the distributor may supply new customer or contact information within a database if needed.

At step 122, a distributor submits a registration or quote form to an ISO for approval. At step 123, another check is done to determine whether an existing opportunity is present. This second check is done to determine whether an opportunity was created by another lead associated with the same lead source as the lead between the time of the check at step 112 and this check at step 123.

If there is no existing opportunity after a search by an ISO at step 123, then the ISO creates a new opportunity from the registration or quote form and attaches it to the newly created opportunity at step 124, which automatically causes a lead source associated with the lead being worked to be populated in a lead source database.

If, however, there is an existing opportunity at step 123, at step 125 an ISO attaches the registration or quote form to such an existing opportunity. In other words, a lead source associated with the lead being worked already exists in the lead source database.

At step 126, lead status is updated and associated to such an opportunity. Accordingly, lead status is associated with a lead source which created a new opportunity or which is associated with an existing opportunity.

Commissions Processing

Figure 12A:
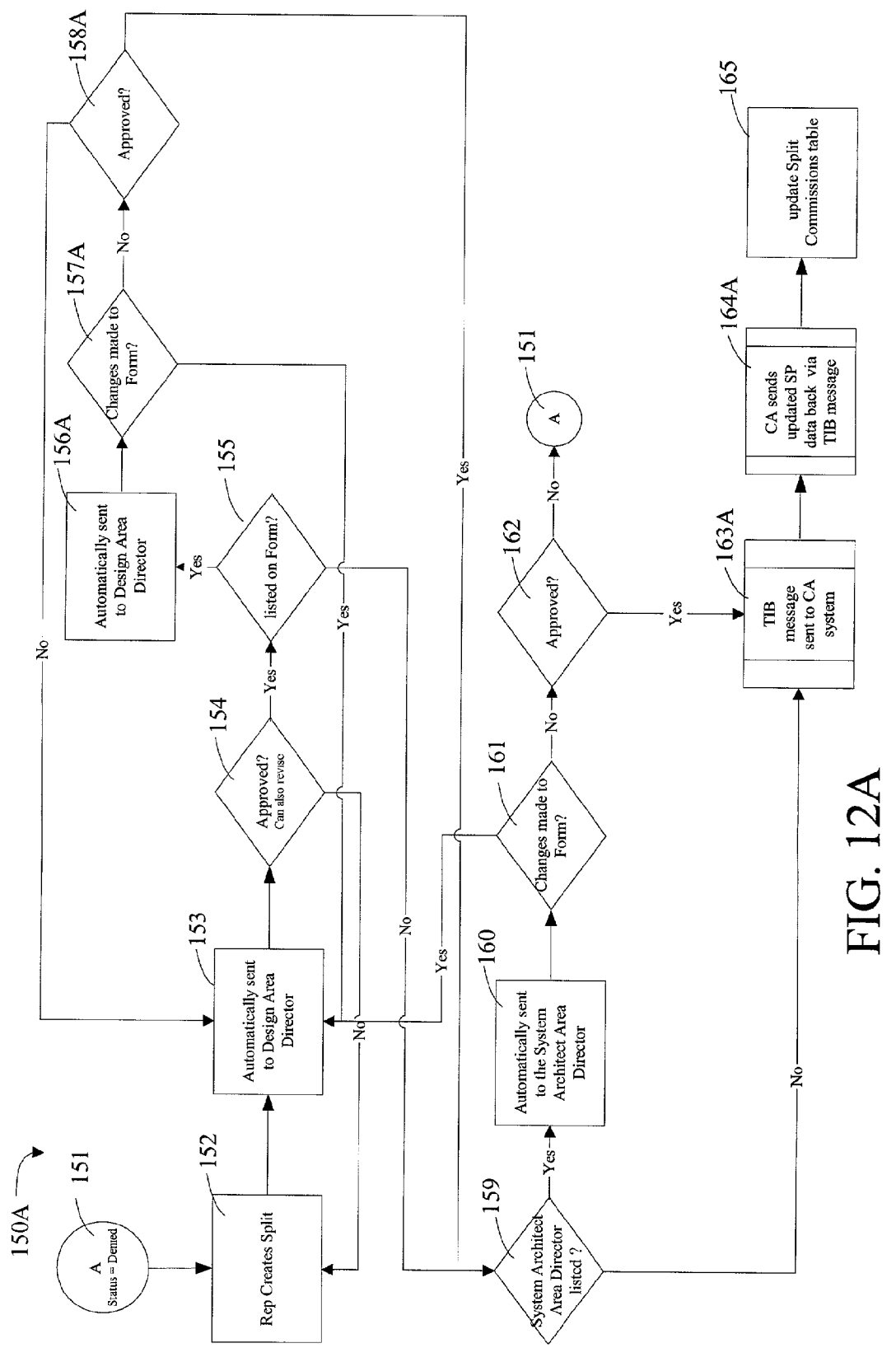
FIG. 12A is a flow diagram of an exemplary embodiment of split commission process in accordance with an aspect of the present invention.

Referring to FIG. 12A, there is shown a flow diagram of an exemplary embodiment of split commission process 150A in accordance with an aspect of the present invention. At step 152, process 150A is initiated by a representative, such as a sales representative, creating a split commission record. This is done by completing a sale representative portion of a GUI form.

At step 153, such split commission record is automatically routed or sent to a design area director listed on such record or otherwise associated with the representative. At step 154, such a design area director determines whether to approve this split commission record. Additionally, the design area director may revise such a split commission record and then approve or reject it. If such split commission record is not approved, it is automatically routed back to the representative that created the record, as indicated by returning to step 152. If, however, such a split commission record is approved by the design area director, then at step 155 it is determined whether a second or another design area director is listed on a GUI form for the split commission record. If another design area director is listed, this split commission record is automatically routed to such other design area director at step 156A. At step 156A, such other listed design area director reviews the split commission record and makes changes, if any.

At step 157A, it is determined if any change was made to such split commission record on the GUI form. If any change was made as determined at step 157A, then such record is automatically routed back to the first design area director, as indicated by returning to step 153. If, however, at step 157A it is determined that no changes were made to the split commission record being processed, then at step 158A it is determined whether the second design area director approved the split commission record. If such split commission record was not approved at step 158A, then such record is automatically routed back to the first design area director, as indicated by returning to step 153. If such split commission record was approved by the second design area director as determined at step 158A or if no second design area director was listed on such split commission record as determined at step 155, then process 150A proceeds to step 159.

At step 159, it is determined whether a system architect area director is listed on the split commission record being processed. If at step 159 it is determined that a system architect area director is so listed, then at step 160 such split commission record is automatically routed to such listed system architect area director for review and approval.

At step 161, it is determined if such system architect area director made any changes to such split commission record on the GUI form. If it is determined that changes were made, then such record is automatically routed back to the first design area director, as indicated by returning to step 153. If it is determined at step 161 that no changes were made to such split commission record on the GUI form, then at step 162 it is determined whether such system architect area director approved such split commission record. If it is determined that such split commission record was not approved, status of the split commission record is set equal to denied at step 151. Records remain in a denied state until finally approved. Such denied split commission record is automatically routed back to the representative, as indicated by returning to step 152.

If such split commission record is approved as determined at step 162 or no system architect area director is listed as determined at step 159, then at step 163A a message, such as an information bus ("IB") message, is sent to a commissions accounting ("CA") system, such as a database matching split commission rules against revenue. At step 164A, such a CA system sends updated split processing ("SP") data via an IB message to a sales force automation (SFA) system 211 (shown in FIG. 1). At step 165, SFA system 211 (shown in FIG. 1) updates a split commissions database table or other listing in accordance with information from such a processed split commission record. Such a database table may be disposed in sales database 218 (shown in FIG.

Figure 12B:
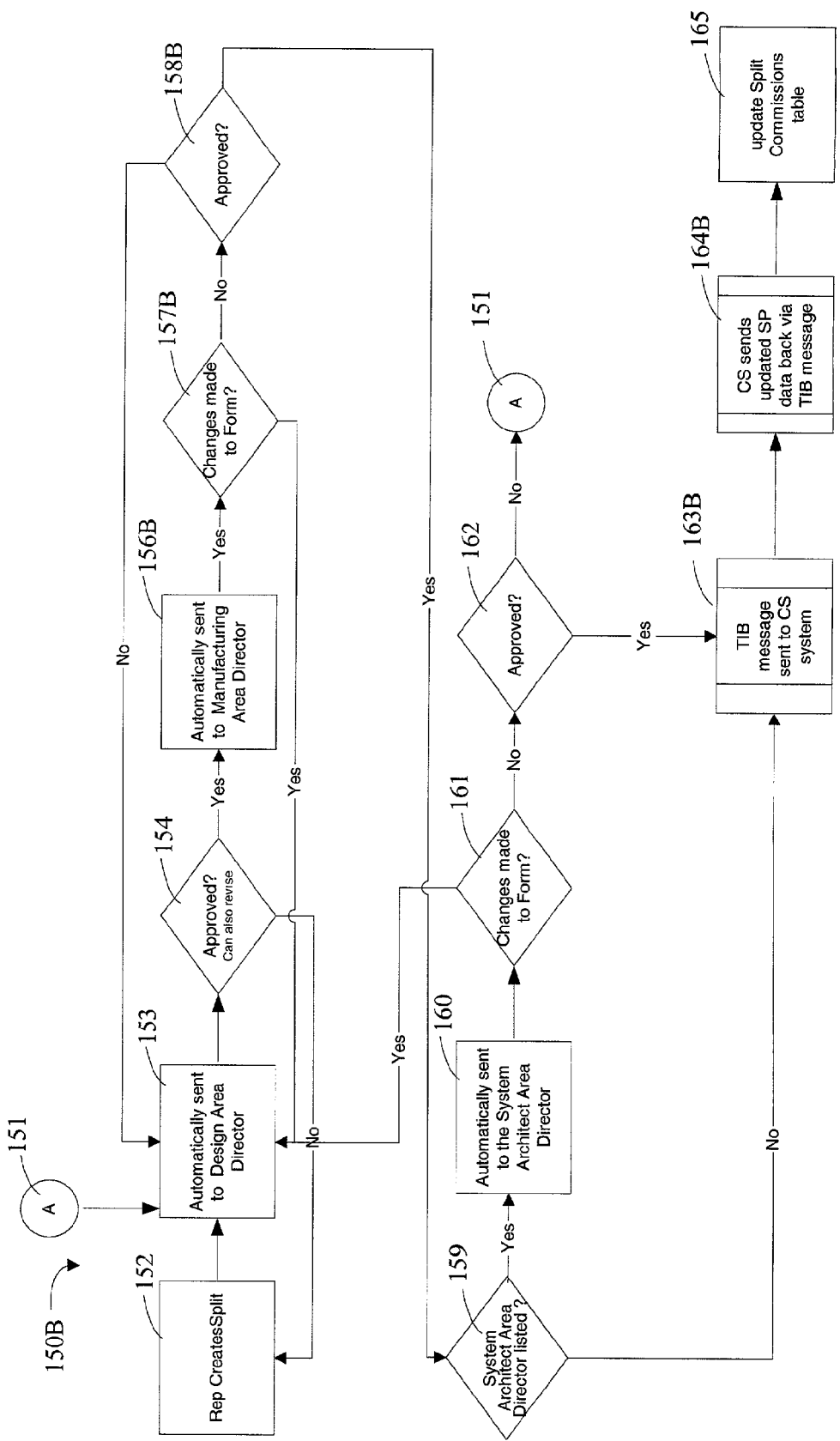
FIG. 12B is a flow diagram of an exemplary embodiment of split commission process in accordance with an aspect of the present invention.

Referring to FIG. 12B, there is shown a flow diagram of an exemplary embodiment of split commission process 150B in accordance with an aspect of the present invention. At step 152, process 150B is initiated by a representative, such as a sales representative, creating a split commission record.

At step 153, such split commission record is automatically routed or sent to a design area director listed on such record or otherwise associated with the representative. At step 154, such a design area director determines whether to approve this split commission record. Additionally, the design area director may revise such a split commission record and then approve or reject it. If such split commission record is not approved, it is automatically routed back to the representative that created the record, as indicated by returning to step 152. If such split commission record is approved, at step 156B such split commission record is automatically routed to a manufacturing area director associated with the design area director for review and approval. At step 156B, the manufacturing area director reviews the split commission record and makes changes, if any.

At step 157B, it is determined if any change was made to such split commission record on the GUI form. If at step 157B it is determined that one or more changes were made, then such record is automatically routed back to the design area director, as indicated by returning to step 153. If, however, at step 157B it is determined that no changes were made to the split commission record being processed, then at step 158B it is determined whether the manufacturing area director approved the split commission record. If such split commission record was not approved at step 158B, then such record is automatically routed back to the design area director, as indicated by returning to step 153. If such split commission record was approved by the manufacturing design area director as determined at step 158B, then process 150B proceeds to step 159.

At step 159, it is determined whether a system architect area director is listed on the split commission record being processed. If at step 159 it is determined that a system architect area director is so listed, then at step 160 such split commission record is automatically routed to such listed system architect area director for review and approval.

At step 161, it is determined if such system architect area director made any changes to such split commission record on the GUI form. If it is determined that changes were made, then such record is automatically routed back to the design area director, as indicated by returning to step 153. If it is determined at step 161 that no changes were made to such split commission record on the GUI form, then at step 162 it is determined whether such system architect area director approved such split commission record. If it is determined that such split commission record was not approved, then status is set equal to denied at step 151, and such denied split commission record is automatically routed back to the design area director, as indicated by returning to step 153.

If such split commission record is approved as determined at step 162 or no system architect area director is listed as determined at step 159, then at step 163B a message, such as an IB message, is sent to a commission system ("CS"), such as a database matching split commission rules against point of sale revenue line items. At step 164B, CS system sends updated split processing ("SP") data via a message to a sales force automation (SFA) system 211 (shown in FIG. 1). At step 165, SFA system 211 (shown in FIG. 1) updates a split commissions database table or other listing in accordance with information from such a processed split commission record. Such a database table may be disposed in sales database 218 (shown in FIG. 1).

Computer System

Figure 13:
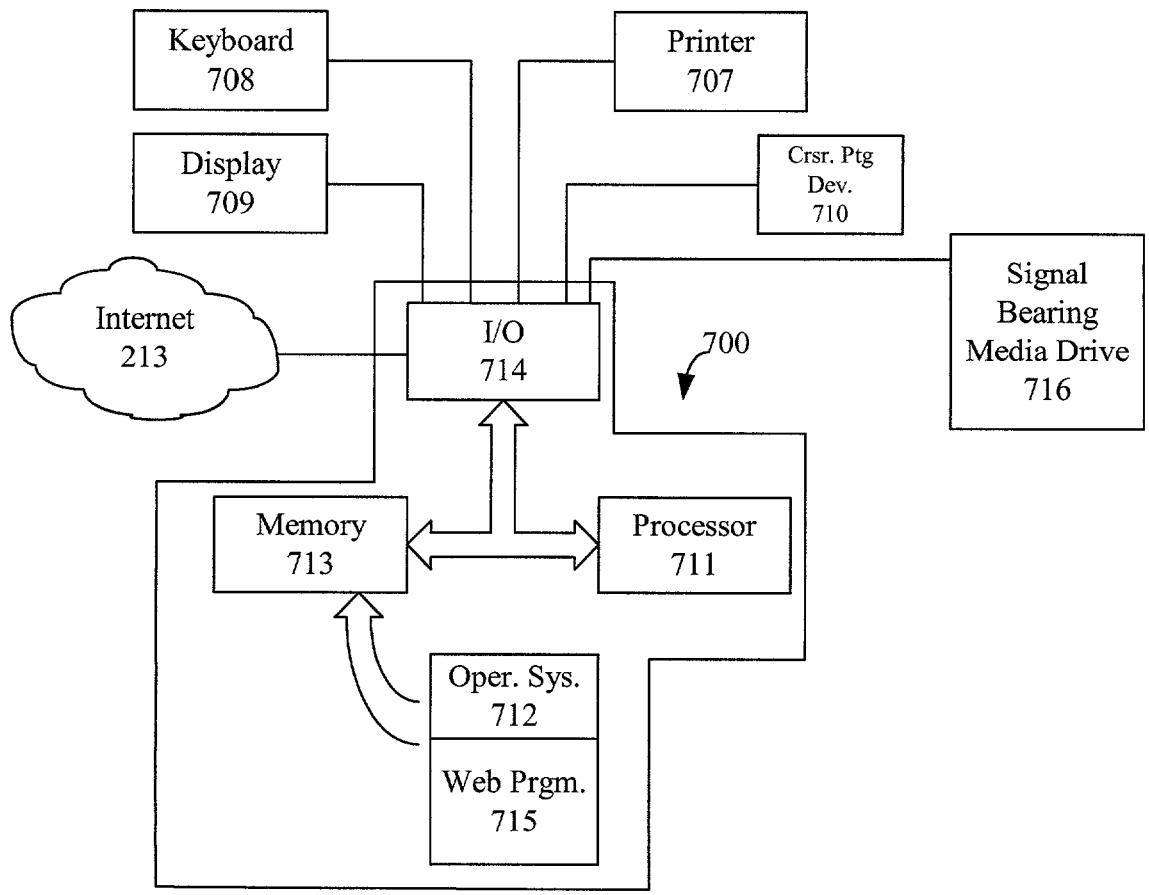
FIG. 13 is a block diagram of a computer system.

Referring to FIG. 13, there is shown a block diagram of a computer system 700. Computer system 700 may be implemented using a configured personal computer, workstation computer, mini computer, mainframe computer, or a distributed network of computers. Computer system 700 may be used for computers 209 or 210 shown in FIG. 1, where back office systems 208, SFA system 211, sales database 218, quality database 217 and support database 216 are stored in memory 713. Moreover, computer system(s) 700 may be located at ISOs, FSOs, regional offices, distributors, among other sales and marketing locations and the like. Computer system 700 is configured with at least one of the following: processor 711, input/output interface 714, and memory 713.

Computer system 700 comprises operating system 712, which may be OS/2, Java Virtual Machine, Linux, Solaris, Unix, Windows, Windows95, Windows98, Windows NT, Windows ME and Windows2000, among other known platforms, and comprises a Web-enabled program 715 such as Microsoft's Internet Explorer, Netscape Navigator or the like. Program 715 is may be a client or server version of such program depending on application. Operating system 712 and program 715 may be disposed in memory 713. Memory 713 may include one or more of the following random access memory, read only memory, magneto-resistive read/write memory, optical read/write memory, cache memory, magnetic read/write memory, among other signal/bearing media and the like.

For purposes of clarity, computer system 700 is described as though it is located at any ISO, FSO, regional office or distributor. Coupled to computer system 700 are printer 707, keyboard 708, signal bearing media drive 716, display screen 709 and cursor-pointing device 710. Though keyboard 708 is provided for data entry, keyboard 708 may be replace by a microphone and well-known voice activation software. Computer system 700 is coupled to the Internet or other network 213 for communicating as described elsewhere herein. Screen images mentioned-above may be displayed on display 709 and acted on using keyboard 708 or cursor-pointing device 710.

An aspect of the present invention is implemented as a program product for use with a computer system such as, computer system 700. The program(s) of the program product defines functions of the embodiments and can be contained on a variety of signal/bearing media, which include, but are not limited to: (i) information permanently stored on read only storage media (e.g., read-only memory devices within a computer such as CD-ROM disks readable by a CD-ROM drive); (ii) alterable information stored on non-read only storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In providing the above-described SFA system 211 (shown in FIG. 1), off-the-shelf programs were used. These programs include Clarify, ClearSales and ClearSupport from Clarify Software, Inc. of San Jose, Calif.; SQL Server from Sybase, Inc. of Emeryville, Calif.; and Oracle of the Oracle Corporation of Redwood City, Calif.

While foregoing is directed to the preferred embodiment of the present invention, other and further embodiments of the invention may be devised without departing from the basic scope thereof, and the scope thereof is determined by the claims that follow. All trademarks are the respective property of their owners. Headings are used merely for organization identification and in no manner are they intended to limit the scope of the subject matter disclosed in their respective sections.

The invention claimed is:

1. A method for automating a sales force, comprising:
providing a first computer programmed with a first web-enabled client;
providing a second computer in communication with the first computer, the second computer programmed with a sales force automation program and a web-enabled server;
providing a third computer programmed with a second web-enabled client;
providing a sales information database accessible by the second computer;
providing a plurality of modules, the plurality of modules comprising a leads module, the plurality of modules being part of the sales force automation program and including graphical user interfaces for web-based access of the sales force automation program of the second computer from the first computer and the third computer;
generating a record object of a lead at the first computer with a graphical user interface console useable with the leads module for web-based communication with the sales force automation program of the second computer;

automatically routing the record object from the first computer to the third computer by the second computer responsive to information contained in the record object;

accepting responsibility of the record object at the third computer responsive to movement of the record object from a queue folder to a work-in-progress folder associated with the graphical user interface console useable with the leads module for web-based communication with the sales force automation program of the second computer;

tracking movement of the record object by the sales force automation program of the second computer responsive to movement from the queue folder to the work-in-progress folder to assign responsibility of the record object;

assigning a status to the lead;

the assigning of the status of the lead being indicated in a lead status field of a graphical user interface of the graphical user interfaces;

the assigning of the status of the lead including a capability of assignment of a first status indicating a lead source that generated the lead resulting in a representative generating the record object receiving credit for all sales associated with the record object as having potential to generate new business;

the assigning of the status of the lead further including a capability of assignment of a second status indicating the lead source that generated the lead resulting in the representative generating the record object not receiving credit for any sales associated with the record object as having no potential to generate new business; and automatically deactivating a create quote button of the graphical user interface of the graphical user interfaces responsive to the assigning of either the first status or the second status.

2. The method of claim 1 wherein the first computer comprises a file directory, the file directory having directories and folders.

3. The method of claim 2 wherein the plurality of modules have the graphical user interfaces for entry of sales information for populating the sales information database.

4. The method of claim 3 wherein the sales information database comprises opportunity records, the opportunity records providing a nexus for access to related records generated from the plurality of modules.

5. The method of claim 3 wherein the sales force automation program is configured to automatically route record objects generated from the plurality of modules for processing to a specified folder.

6. The method of claim 1 wherein the automatically routing of the record object comprises determining a delivery location, the delivery location based on origin, type and content of data.

7. The method of claim 6 wherein the record object is automatically routed to the queue folder.

8. A sales force automation system, comprising:

a first computer, the a first computer programmed with a first web-enabled client;

a second computer in communication with the first computer, the second computer programmed with a sales force automation program and a web-enabled server;

a sales information database accessible by the second computer;

the sales force automation program having a plurality of modules, the plurality of modules comprising a leads module;

the sales force automation program providing a console from which tasks associated with the plurality of modules may be initiated;

the console providing a display of a queue folder and a work-in-progress folder;

the console configured to track movement of workflow objects associated with leads generated using the leads module from the queue folder to the work-in-progress folder to assign responsibility;

assigning a status to the lead;

the assigning of the status of the lead being indicated in a lead status field of a graphical user interface of the graphical user interfaces;

the assigning of the status of the lead including a capability of assignment of a first status indicating a lead source that generated the lead resulting in a representative generating the record object receiving credit for all sales associated with the record object as having potential to generate new business;

the assigning of the status of the lead further including a capability of assignment of a second status indicating the lead source that generated the lead resulting in the representative generating the record object not receiving credit for any sales associated with the record object as having no potential to generate new business; and automatically deactivating a create quote button of the graphical user interface of the graphical user interfaces responsive to the assigning of either the first status or the second status.

9. The system of claim 8 wherein the second computer is in communication with back office systems.

* * * * *